US008386465B2

(12) United States Patent
Ansari et al.

(10) Patent No.: US 8,386,465 B2
(45) Date of Patent: Feb. 26, 2013

(54) SYSTEM AND METHOD TO MANAGE AND DISTRIBUTE MEDIA USING A PREDICTIVE MEDIA CACHE

(75) Inventors: Amir Ansari, Plano, TX (US); George A. Cowgill, Farmersville, TX (US); Ramprakash Masina, Wylie, TX (US); Jude P. Ramayya, Wylie, TX (US); Alvin R. McQuarters, Euless, TX (US); Atousa Raissyan, Potomac, MD (US); Leon E. Nicholls, Plano, TX (US); Marshall T. Rose, Sacramento, CA (US); Robert Clavenna, Lucas, TX (US)

(73) Assignee: Prodea Systems, Inc., Plano, TX (US)

( * ) Notice: Subject to any disclaimer, the term of this patent is extended or adjusted under 35 U.S.C. 154(b) by 659 days.

(21) Appl. No.: 12/167,919

(22) Filed: Jul. 3, 2008

(65) Prior Publication Data
US 2009/0037382 A1 Feb. 5, 2009

Related U.S. Application Data

(63) Continuation-in-part of application No. 11/966,945, filed on Dec. 28, 2007, now Pat. No. 7,987,490.

(60) Provisional application No. 60/882,865, filed on Dec. 29, 2006, provisional application No. 60/882,862, filed on Dec. 29, 2006.

(51) Int. Cl.
G06F 7/00 (2006.01)
G06F 17/30 (2006.01)
(52) U.S. Cl. ........................................ 707/713
(58) Field of Classification Search .................. 707/713, 707/766
See application file for complete search history.

(56) References Cited

U.S. PATENT DOCUMENTS
(Continued)

FOREIGN PATENT DOCUMENTS
EP 1113659 A 7/2001
EP 1 394 986 3/2004
(Continued)

OTHER PUBLICATIONS

PCT Invitation to Pay Additional Fees and, Where Applicable, Protest Fee (PCT/ISA/206), and Communication Relating to the Results of the Partial International Search (Annex to PCT/ISA206) dated May 19, 2008 for PCT Application No. PCT/US2007/089237, 7 pages.

(Continued)

Primary Examiner — James Trujillo
Assistant Examiner — Jeffrey Chang
(74) Attorney, Agent, or Firm — Kermit D. Lopez; Luis M. Ortiz; Ortiz & Lopez, PLLC

(57) ABSTRACT

A system for decreasing the perceived end user latency while interacting with a database. The system comprises the database storing metadata associated with one or more of media, files, data, devices and services, a user interface operable to receive a user generated query selected from a plurality of user generated query options, the plurality of user generated query options representing at least one of a user selectable object displayed by the user interface, and a processor having a predictive module operable to generate at least one background query of the database prior to the user interface receiving the user generated query, the at least one background query correlating to at least one of the user generated query options. The predictive module compares the user generated query to the at least one background query prior to sending the user generated query to the database such that if the user generated query corresponds to the at least one background query the user interface displays a result to the at least one background query.

75 Claims, 18 Drawing Sheets

U.S. PATENT DOCUMENTS

| | | | |
|---|---|---|---|
| 5,878,223 | A | 3/1999 | Becker et al. |
| 6,016,520 | A | 1/2000 | Facq et al. |
| 6,055,569 | A | 4/2000 | O'Brien et al. |
| 6,426,955 | B1 | 7/2002 | Dalton, Jr. et al. |
| 6,622,168 | B1 | 9/2003 | Datta |
| 6,871,193 | B1 | 3/2005 | Campbell et al. |
| 6,889,321 | B1 | 5/2005 | Kung et al. |
| 7,836,044 | B2 * | 11/2010 | Kamvar et al. ............... 707/713 |
| 7,987,490 | B2 | 7/2011 | Ansari et al. |
| 2002/0184620 | A1 | 12/2002 | Davies et al. |
| 2003/0169752 | A1 | 9/2003 | Chen et al. |
| 2004/0073867 | A1 | 4/2004 | Kausik et al. |
| 2004/0133657 | A1 | 7/2004 | Smith et al. |
| 2005/0076198 | A1 | 4/2005 | Skomra et al. |
| 2005/0216949 | A1 | 9/2005 | Candelora et al. |
| 2005/0257039 | A1 | 11/2005 | Marshall |
| 2006/0029064 | A1 | 2/2006 | Rao et al. |
| 2006/0031476 | A1 | 2/2006 | Mathes et al. |
| 2006/0122976 | A1 * | 6/2006 | Baluja et al. ...................... 707/3 |
| 2006/0291506 | A1 | 12/2006 | Cain |
| 2007/0050351 | A1 * | 3/2007 | Kasperski et al. ................ 707/4 |
| 2007/0143262 | A1 * | 6/2007 | Kasperski ........................ 707/3 |
| 2008/0165789 | A1 | 7/2008 | Ansari et al. |
| 2008/0189774 | A1 | 8/2008 | Ansari et al. |
| 2009/0067441 | A1 | 3/2009 | Ansari et al. |
| 2009/0070229 | A1 | 3/2009 | Ansari et al. |
| 2009/0168787 | A1 | 7/2009 | Ansari et al. |
| 2010/0071053 | A1 | 3/2010 | Ansari et al. |
| 2010/0202450 | A1 | 8/2010 | Ansari et al. |
| 2010/0205152 | A1 | 8/2010 | Ansari et al. |
| 2010/0205301 | A1 | 8/2010 | Ansari et al. |
| 2010/0217837 | A1 | 8/2010 | Ansari et al. |
| 2010/0231790 | A1 | 9/2010 | Ansari et al. |
| 2010/0235433 | A1 | 9/2010 | Ansari et al. |
| 2010/0241711 | A1 | 9/2010 | Ansari et al. |
| 2010/0241748 | A1 | 9/2010 | Ansari et al. |

FOREIGN PATENT DOCUMENTS

| | | |
|---|---|---|
| WO | WO 0193533 A2 | 12/2001 |
| WO | WO 2007/004921 | 1/2007 |
| WO | 2008021665 A2 | 2/2008 |
| WO | WO-2008/082441 | 7/2008 |
| WO | WO-2008/083384 | 7/2008 |
| WO | WO-2008/083385 | 7/2008 |
| WO | WO-2008/083387 | 7/2008 |
| WO | WO-2008/083391 | 7/2008 |
| WO | WO-2008/085201 | 7/2008 |
| WO | WO-2008/085202 | 7/2008 |
| WO | WO-2008/085203 | 7/2008 |
| WO | WO-2008/085204 | 7/2008 |
| WO | WO-2008/085205 | 7/2008 |
| WO | WO-2008/085206 | 7/2008 |
| WO | WO-2008/085207 | 7/2008 |
| WO | WO-2009/036088 | 3/2009 |
| WO | WO-2009/036185 | 3/2009 |
| WO | WO-2009/086134 | 7/2009 |

OTHER PUBLICATIONS

PCT Invitation to Pay Additional Fees and, Where Applicable, Protest Fee (PCT/ISA/206), and Communication Relating to the Results of the Partial International Search (Annex to PCT/ISA206) dated May 21, 2008 for PCT Application No. PCT/US2007/089227, 7 pages.

Yeon-Joo Oh, et al., "Design of a SIP-based Real-time Visitor Conversation and Door Control Architecture using a Home Gateway", 2006 IEEE, Jan. 7, 2006, pp. 187-188.

Haerick W et al., Success in Home Service Deployment: Zero-Touch or Chaos?, British Telecommunications, Jul. 1, 2007, pp. 36-43, vol. 4, No. 3, London, GB.

Duenas JC et al., An end-to-end service provisioning scenario for the residential environment, IEEE Communications Magazine, Sep. 1, 2005, pp. 94-100, vol. 43, No. 9, IEEE Service Center, Piscataway, US.

Il-Woo Lee et al., A Proposed Platform & Performance Estimation of Digital-Home Service Delivery/Management Systems, Apr. 10, 2006, pp. 713-719, Information Technology: New Generations, 2006. ITNG 2006. Third International Conference on Las Vegas, NV, USA Apr. 10-12, 2006.

PCT Notification of Transmittal of the International Search Report and the Written Opinion of the International Searching Authority, or the Declaration dated Feb. 26, 2008, for PCT Application No. PCT/US07/19483, 11 pages.

PCT Notification of Transmittal of the International Search Report and the Written Opinion of the International Searching Authority, or the Declaration dated Mar. 14, 2008, for PCT Application No. PCT/US07/19533, 12 pages.

PCT International Searching Authority—European Patent Office, PCT Notification of Transmittal of the International Search Report and the Written Opinion of the International Searching Authority, or the Declaration mailed Oct. 22, 2008, 12 pages, Application No. PCT/US2007/089232.

Young-Gab Kim et al., A Service Bundle Authentication Mechanism in the OSGI Service Platform, Advanced Information Networking and Applications, 2004, AINA 2004. 18th International Conference on Fukuoka, Japan, Mar. 29-31, 2004, Piscataway, NJ, USA, IEEE, vol. 1, Mar. 29, 2004, pp. 420-425, XP010695453, ISBN: 978-0-7695-2051-3.

PCT International Searching Authority—European Patent Office, PCT Notification of Transmittal of the International Search Report and the Written Opinion of the International Searching Authority, or the Declaration, Aug. 27, 2008, 24 pages, Application No. PCT/US2007/089237.

PCT International Searching Authority—European Patent Office, PCT Notification of Transmittal of the International Search Report and the Written Opinion of the International Searching Authority, or the Declaration, Aug. 8, 2008, 22 pages, Application No. PCT/US2007/089227.

* cited by examiner

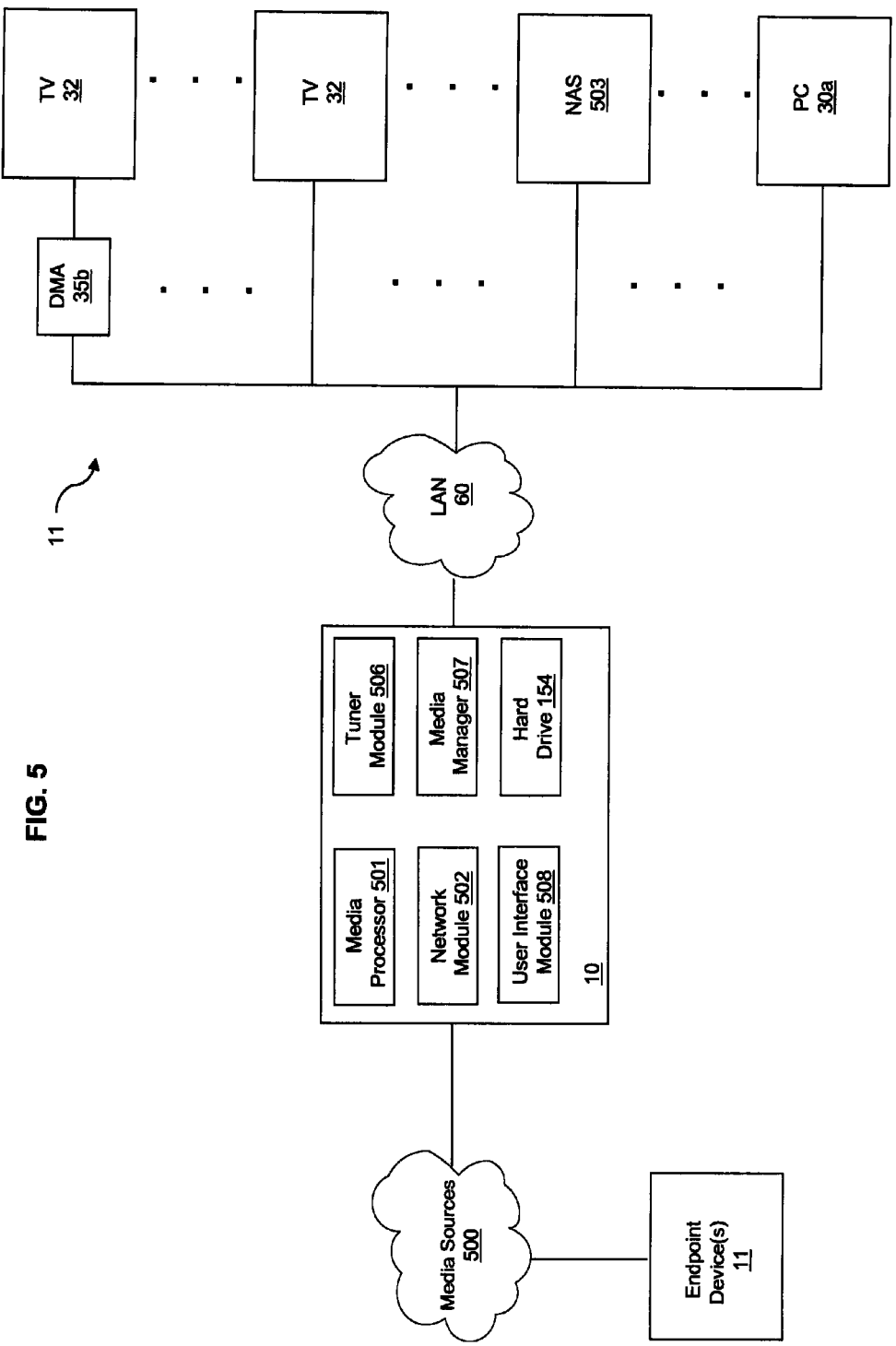

FIG. 12

| Idx | Title | Duration | Artist | Album |
|---|---|---|---|---|
| 598 | I Melt With You | 00:03:49 | Modern English | 18 Modern Rock Classic... |
| 640 | If You Leave | 00:04:28 | Orchestral Manoeuvres I... | 18 Modern Rock Classic... |
| 767 | Love Plus One | 00:03:38 | Haircut 100 | 18 Modern Rock Classic... |
| 900 | One Thing Leads To Another | 00:03:15 | The Fixx | 18 Modern Rock Classic... |
| 918 | Perfect Way | 00:04:05 | Scritti Politti | 18 Modern Rock Classic... |
| 1048 | Situation | 00:03:44 | Yaz | 18 Modern Rock Classic... |
| 1055 | Smalltown Boy | 00:04:05 | Bronski Beat | 18 Modern Rock Classic... |
| 1190 | Things Can Only Get Better | 00:03:57 | Howard Jones | 18 Modern Rock Classic... |
| 1216 | True Faith | 00:04:07 | New Order | 18 Modern Rock Classic... |

Soft DMA

PRODEA SYSTEMS

<..dia < music < album < 1

Album:

Page: 1 of 38

470 tunes

SYSTEM AND METHOD TO MANAGE AND DISTRIBUTE MEDIA USING A PREDICTIVE MEDIA CACHE

RELATED APPLICATIONS

This application is a continuation-in-part application of U.S. patent application Ser. No. 11/966,945, filed Dec. 28, 2007 now U.S. Pat. No. 7,987,490, and entitled "System and Method to Acquire, Aggregate, Manage, and Distribute Media." This application also claims the benefit of U.S. Provisional Application No. 60/882,865 Filed Dec. 29, 2006 entitled "A Multi-Services Application Gateway And System Employing The Same," and of U.S. Provisional Application No. 60/882,862 Filed Dec. 29, 2006 entitled "System And Method For Providing Network Support Services And Premise Gateway Support Infrastructure," the disclosures of which are entirely incorporated herein by reference.

This application is related to co-pending applications U.S. patent application Ser. No. 11/966,884, filed Dec. 28, 2007, entitled "Activation, Initialization, Authentication, and Authorization for a Multi-Services Gateway Device at User Premises," and to U.S. patent application Ser. No. 11/966,936, filed Dec. 28, 2007, entitled "Billing, Alarm, Statistics and Log Information Handling In Multi-Services Gateway Device at User Premises," and to PCT International Application No. PCT/US2007/019546, filed Sep. 7, 2007, entitled "Multi-Services Application Gateway," and to PCT International Application No. PCT/US2007/019544, filed Sep. 7, 2007, entitled "System and Method for Providing Network Support Services and Premises Gateway Support Infrastructure," and to PCT International Application No. PCT/US2007/019545, filed Sep. 7, 2007, entitled "Subscription Management of Applications and Services Provided Through User Premises Gateway Devices," and to PCT International Application No. PCT/US2007/019543, filed Sep. 7, 2007, entitled "Demarcation Between Service Provider and User in Multi-Services Gateway Device at User Premises," and to PCT International Application No. PCT/US07/0195333, filed Sep. 7, 2007, entitled "Display Inserts, Overlays, and Graphical User Interfaces for Multimedia Systems," and to PCT International Application No. PCT/US07/19534, filed Sep. 7, 2007, entitled "Presence Status Notification From Digital Endpoint Devices Through a Multi-Services Gateway Device at the User Premises," and to PCT International Application PCT/US2007/019483, filed Sep. 7, 2007, entitled "Managed File Backup and Restore at Remote Storage Locations Through Multi-Services Gateway Device at User Premises," and to PCT International Application No. PCT/US2007/019531, filed Sep. 7, 2007, entitled "File Sharing Through Multi-Services Gateway Device at User Premises," the disclosures of which are incorporated by reference.

TECHNICAL FIELD

The present subject matter relates to the management of media content and associated metadata through a gateway device at a user premises, wherein the gateway device is associated with endpoint devices to facilitate management of the media content and metadata, where a demarcation is defined between resources of the gateway accessible to and managed by a service provider and service access by a user via an endpoint device.

BACKGROUND

The digital home is now becoming more complex with the myriad of new and emerging digital devices intended to address many user and consumer needs such as communication, entertainment, privacy, and security. However, given the complexity of the emerging digital home and digital environments generally, users who are technologically challenged may find it a daunting and intimidating task to manage their local premises networks and interconnected digital devices. Moreover, new paradigms are emerging oriented to delivering media content to and the consuming of media content at a premises. The availability of numerous sources of media content, whether from the internet and otherwise, has led consumers to increase the amount of media content stored in the premises, which has correspondingly required an increase in the capabilities for storage of media content. The creation of multiple media content databases accessible to the consumer requires a timely responsive interaction with the user to enable the user to browse, search, and access the media content without any user-perceived response latency. As capabilities in premises have expanded to allow for storage and rendering of large amounts of media content, a need has arisen to improve the interaction with the consumer, and the responsiveness of these databases and access to the stored media content. Because networks in local premises, such as the home, involve a relatively small number of users (typically less than a dozen), novel approaches that are not readily employable when a database has a very large user set may be implemented to meet these needs.

SUMMARY OF THE INVENTION

The intent of the present invention is not primarily to improve the retrieval of data from a database, or to improve the efficiency of the search algorithm employed to find objects in the database; rather the predictive media cache makes the display to the consumer of the results of the database retrieval and search process more timely, responsive, and interactive. Although described in the context of retrieval of media content from a database of media content, the invention herein described may be applied to all types of database retrieval.

A system for decreasing the perceived end user latency while interacting with a database. The system comprises the database storing metadata associated with one or more of media, files, data, devices and services, a user interface operable to receive a user generated query selected from a plurality of user generated query options, the plurality of user generated query options representing at least one of a user selectable object displayed by the user interface, and a processor having a predictive module operable to generate at least one background query of the database prior to the user interface receiving the user generated query, the at least one background query correlating to at least one of the user generated query options. The predictive module compares the user generated query to the at least one background query prior to sending the user generated query to the database such that if the user generated query corresponds to the at least one background query the user interface displays a result to the at least one background query.

A system for decreasing the perceived end user latency while interacting with a media database. The system comprises the media database storing metadata associated with media, a media manager in communication with at least one media player and operable to access the media database. The at least one media player each having a user interface operable to receive user input. The system further comprising a predictive module operable to generate at least one query based on the user input and to derive at least one background query of the database in anticipation of any at least one generated query. The predictive module compares the at least one generated query to the at least one derived background query such that if the generated query corresponds to the at least one background query the user interface displays a result to the at least one background query.

A method for decreasing the perceived end user latency while interacting with a database. The method comprises aggregating metadata associated with media in the database, performing at least one first predictive background query of the database, receiving and storing a result of the at least one first predictive background query, receiving user input at a user interface, generating at least one query based on the user input, comparing the at least one generated query to the at least one first predictive background query, and displaying a result to the at least one first predictive background query in response to the comparison.

A computer-readable medium having encoded thereon a method for decreasing the perceived end user latency while interacting with a database. The method comprises aggregating metadata associated with media in the database, performing at least one first predictive background query of the database, receiving and storing a result of the at least one first predictive background query, receiving user input at the user interface, generating at least one query based on the user input, comparing the at least one generated query to the at least one first predictive background query, performing at least one second predictive background query of the database in response to the at least one first predictive background query not encompassing the at least one generated query, and presenting the stored result of the at least one first predictive background query via the user interface in response to the at least one first predictive background query encompassing the at least one generated query.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a high-level architectural overview of an exemplary system to manage the multiplicity of media storage devices and sources in a way that provides a centralized, logical view of all media, and corresponding metadata, available to the user.

FIG. 12 is an exemplary screen shown to the user after selecting "18 Modern Rock Classics" from the screen shot shown in FIG. 11.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In practice, a customer typically subscribes to basic transport services from a network service provider (e.g., ISP—Internet Service Provider, cable provider, fixed wireless providers, ILEC—Incumbent Local Exchange Carrier, or CLEC—Competitive Local Exchange Carrier). For example, a customer may have broadband Internet access, via cable modem, digital subscriber line service or the like. Digital video service may be provided separately. The network service provider manages these basic services, at the logical network layer, typically at layers 1, 2 and 3 of the Open Systems Interconnection (OSI) model. While network services and associated devices may operate minimally at those levels, they operate at those levels to support operations at OSI layers 1, 2 and 3. Many applications, however, involve higher level service logic for applications that view the network transport as simply a transport pipe. The current Internet applications delivery and management architecture, and many devices or management systems based on it, require a server with robust processing and storage capability to be located at the network operations center, not in the home. For Voice Over Internet Protocol (VoIP) type telephone service, for example, the VoIP service provider operates a session initiation protocol (SIP) server or the like, and each user has only client functionality. The network transport layers are transparent to the Internet Protocol (IP) packets containing the voice and related signaling data. The SIP server, however, controls the call set-up, tear-down, billing and the like for the voice call services. With such a legacy architecture, the major capabilities and functionalities connected with providing application services from the server throughout the network reside on the server and supporting elements, all of which are located in the network operations center of the network service provider.

Figure 1:
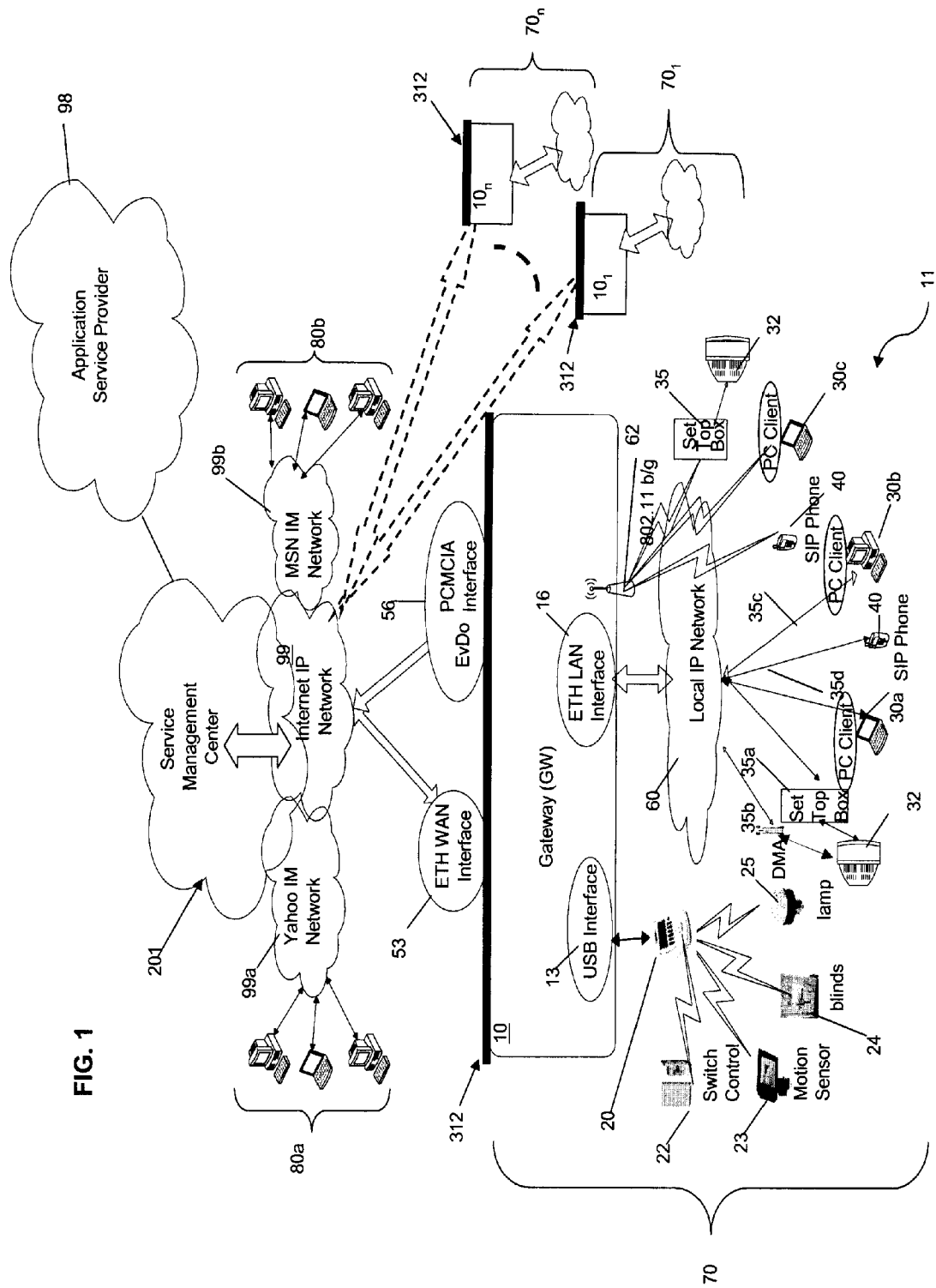
FIG. 1 is a network diagram of an embodiment of an exemplary system having a service management center connected to gateway devices that are connected to respective endpoint devices at the user premises.

FIG. 1 is a network diagram of an embodiment of an exemplary system having a service management center 201 connected to gateway devices 10 that are connected to respective endpoint devices 11 at the user premises. This secure platform for building and providing multiple application services for digital endpoints 11 associated with a gateway device 10 requires connectivity between the gateway device 10 and each of a user's endpoint devices 11. As shown in FIG. 1, this connectivity may be provided by network interfaces such as one or more USB interfaces 13, wired Local Area Network (LAN) connections such as provided by an Ethernet LAN interface 16, a wireless network interface via a WiFi LAN access point 62, other LAN transport technologies such as HPNA or HomePlugAV, or other technologies now available or hereafter developed. The WiFi connection may be implemented for example, in accordance with the I.E.E.E. 802.11 b/g/n wireless network communications standard. These interfaces provide the required network interconnectivity for the endpoint devices 11 to connect to the gateway device 10 to access multiple application services residing on the gateway device 10. The connectivity between digital endpoint devices 11 and the gateway device 10 may be accomplished by other suitable means now known or to be developed, including, by way of example, through of a virtual private area network connection accessed through a WAN interface.

Exemplary endpoint devices 11, with which the gateway device 10 may communicate via the USB interface 13, include, for example, a home automation networking device 20 (e.g. X10, Z-Wave or ZigBee) for wired or wireless home network automation. The device 20 which in turn controls devices such as a switch controller 22, sensor devices 23, automatically-controlled window blinds 24, and a controlled lighting or lamp unit 25, for example. Furthermore, the gateway device 10 may communicate via the Ethernet LAN interface 16 across a local IP network 60 or via the WiFi LAN access point 62 to reach personal computing (PC) and laptop/mobile devices 30a, . . . , 30c that serve as file sources, control points and hosts for various other endpoint devices 11. In addition, the gateway device 10 may communicate via Ethernet LAN interface 16 across a local IP network 60 or via WiFi LAN access point 62 to access one or more television display devices 32 including the associated set top boxes (STB) 35a or digital media adapters (DMA) 35b. As further examples, one or more SIP phones (or VoIP phone devices) 40, or other devices that convert IP interfaces to Public Switched Telephone Network (PSTN) Foreign eXchange Office (FXO) and Foreign eXchange Subscriber (FXS) interfaces may be accessed by gateway device 10 via Ethernet LAN interface 16 across a local IP network 60 or via WiFi LAN access point 62. The endpoint devices 11 shown in FIG. 1 and the respective interfaces used by gateway device 10 to reach the endpoint devices 11 are not intended to be comprehensive and one skilled in the art can appreciate other endpoint devices 11 as well as other methods to allow gateway device 10 to communicate with potential endpoint devices 11 within this exemplary system.

As noted earlier, the gateway device 10 may access the DMA 35b for a television display device 32, which enables bidirectional wireline or wireless communication. The DMA 35b supports several functions for multiple services including, but not limited to: media (e.g., video and music) by enabling the transfer of media (e.g., video and music) to the TV; voice services, by providing for Calling Line Identification (CLID) and for voice mail control; and provide Home Automation Services including status and control of networked home automation devices. The DMA 35b converts audio and video (optionally) to a format suitable for a TV. In addition, the DMA 35b may be capable of receiving context-sensitive commands from a remote control device (not shown) and forwarding those commands to the gateway device 10. This enables the use of menus on the television display device 32 for controlling application services and various features functions thereof, as offered by the gateway device 10. Therefore, the combination of the gateway device 10, DMA 35, and the television display device 32 one is able to provide the following features including, but not limited to: display of media; media control functions, when enabled (FF, REW, STOP, PAUSE, etc); display of CLID; control of voice-mail; picture viewing; control of home automation; and user functions for the gateway device 10.

A set top box 35a is in communication with the gateway device 10 via the wireless access point 62. The set top box 35a also may handle media format conversion (for example NTSC to ATSC television RF signals), digital decryption and other DRM (digital rights management) functions, Video On Demand Purchases, etc. The combination of the Set Top Box 35a with the television display device 32 may enable, by way of example, Media format conversion (for example NTSC to ATSC); decryption; other DRM functions (such as expiry of leases), prohibition of copying to digital outputs, function restriction, etc.; Video On Demand Purchases; and media control functions (e.g., FF, REW, STOP, PAUSE, etc.).

Whether provided by the DMA 35b and the television display device 32 or by the set-top-box 35a and the television display device 32, the communications to and from the television display device 32 provide a user interface for interaction with the gateway device 10. The software/firmware of the gateway device 10 supports, among other things, a graphical user interface (GUI) via the television display device 32, sometimes referred to as the "ten-foot" interface.

The PCs 30a, . . . , 30c shown in FIG. 1 interface with the gateway device 10 and serve as, among other things, file sources, control points and hosts for various software clients. The gateway device 10 may access PC device 30b via Ethernet LAN interface 16 across a local IP network 60 or via WiFi LAN access point 62. The gateway device 10 accessing the PC may provide for the bidirectional moving of files, and status and control for the endpoint devices 11, including for example, status and control of networked home automation devices. In addition, using the PCs 30a, . . . , 30c, users may access the gateway device 10 for any number of reasons, such as for example, share files on the gateway device 10 with other endpoint devices 11, back-up or transfer files to the gateway device 10 or other endpoint devices 11 having storage capabilities; access personal page for notifications, receive RDF site summary (RSS) or Atom feeds, share photos, and receive voicemail messages. In addition to the Instant Messaging and SIP capabilities of the gateway device 10, as will be described in more detail below, PCs 30a, . . . , 30c may also serve as a host for IM and SIP soft phone clients and other endpoint devices 11. The client-server interaction of the PCs 30a, . . . , 30c with the gateway device 10 offers an alternative GUI for at least some of the services. The PC based GUI is sometimes referred to as the "two-foot" interface.

Although not shown in FIG. 1, other digital endpoint devices 11 for which connectivity may be established with the gateway device 10 include, but are not limited to, media player devices (audio, video, audio/video, with or without metadata), hi-fi audio equipment with media streaming capability, game stations, Internet radio devices, WiFi phones, WiFi or other wirelessly enabled digital cameras, facsimile machines, electronic picture frames, health monitors (sensor and monitoring devices) and devices now known or to be developed. In addition to endpoint devices coupled via the LAN, the endpoint devices may be directly coupled to the gateway device off the Internet or private IP networks.

Although based on a client-server architecture, the exemplary system disclosed in FIG. 1 moves substantial functions performed by the typical network server into the user premises 70 by incorporating those functions into a gateway device 10, but in a way that allows for the server functionality to be externally managed by a service management center 201, which may in turn be operated by a third-party application service provider 98. Moreover, the architecture of the exemplary system does not require identity of the provider/manufacturer of the gateway device, the service management center or the third-party application service provider. Thus, a gateway device may be manufactured under the control of one entity, for distribution to one or more service management entities (each of which operates its own service management center). The gateway device may then be activated with a particular service management center under the control of a particular system management entity. A system management entity may be the entity that determines the mix of application services to which the user subscribes, or this "retail" function for application services may be performed by one or more application service providers, one or more of whom the user may subscribe to depending on the mix of application services offered by each application service provider. The term "application service provider" is used herein to refer to various entities up and down the "supply chain" and include, but are not limited to, manufacturers of the gateway device and endpoint devices, suppliers of the gateway device and endpoint devices, entities that provide, operate or manage application services, network service providers (described above), and entities that provide the activation manager function described in detail below. These entities in the supply chain may or may not operate or function independently of one another. Hereinafter, the term "remote service manager" is also used to refer to the service management center 201 and/or application service provider 98.

The server functionality residing in the gateway device 10 is not only located in the user premises 70 but it now resides on the user premises side of the traditional network service provider demarcation 312. The exemplary system shown in FIG. 1 does not just move server functionality from the servers in a traditional network operations center, where they were previously located, to the home; but it also moves the logical position of the execution of application services logic of the server to the user premises 70 side of the network service provider demarcation 312 and provides logical hooks to enable the external service manager to perform its function(s) on that side of the demarcation. For example, application service logic transmitted by application service provider 98 related to the use of one or more gateway devices 10 and/or endpoint devices 11 can now be provisioned, serviced and managed on the user premises 70 side of the network service provider demarcation 312, albeit by an external service management center 201 operated by or on behalf of a third-party application service provider 98. The application software architecture, coupled with the specific managed hardware implementation at the user premises 70, enables a single service provider to provide the network services such as IP network 99, whereas one or more application services providers 98 (possibly including the network service provider) can provide the applications services to the customer independently of providing the network service.

By distributing the application services to the user premises 70, but retaining a central management feature through the service management center 201 and the application service provider(s) 98, the disclosed exemplary system in FIG. 1 addresses network computing and traffic capacity and latency challenges of providing application services at the network level. The exemplary architecture thus results in significantly reduced latency and improved reliability.

Another aspect of the exemplary system in FIG. 1 is that it enables the application service provider 98 through the use of the service management center 201 to control hardware elements (endpoint devices 11) of various types located on the user premises 70 side of the network service provider demarcation 312 by communicating through the gateway device 10. The robustness of the gateway device 10, coupled with the central management capabilities of the service management center 201 and application service provider 98, allow the system to register, configure, provision, and enable intercommunication among, a wide variety of endpoint devices 11, such as TV, cell phone, radios, PC, and digital picture frames. Furthermore, the exemplary system can gather operational information such as billing records, alarms, statistical data, and log information associated with gateway device 10 and the endpoint devices 11 connected to gateway device 10. Such a centralized management greatly reduces the burden on end users in managing their equipment or network and provides an application service provider 98 through the service management center 201 the ability to optimize service delivery.

As previously mentioned, FIG. 1 demonstrates the exemplary network configuration. Broadly speaking the major components of the exemplary system are gateway device 10 which is connected to services management center 201 and thereby application service provider 98 via a wide area network, such as, by way of example, IP network 99. Furthermore, the exemplary system has gateway device 10 located on the user premises 70 associated with various endpoint devices 11.

As discussed in more detail below, the novel system architecture of the exemplary network configuration as shown in FIG. 1 allows for the management of services for the gateway device 10 and endpoint devices 11 and facilitates the easy addition of new services or modification of existing services on the gateway 10 and endpoint devices 11 via application service provider 98 through service management center 201. Such services may include, for example, facility management (home automation), media content downloading and Digital Rights Management (DRM), device updates, data backups, file sharing, media downloading, and transmission. All these services may be provided, from the user's perspective, without the intermediary of a plurality of external service providers who may typically provide these individual services for every endpoint device 11 in the user premises 70; rather, the user may receive, through the system architecture, application services for all these devices, which application services may be managed through the system architecture by a network service provider.

The software/firmware for these services resides in the gateway device 10. The gateway device 10 is integrated with hardware and software modules and respective interfaces that handle all aspects of home automation and digital endpoint service and management for the home in a manner without having to rely on external service providers and in a manner that is essentially seamless to the user. This is advantageously provided by the service management center 201 which is able to access regions of the gateway device 10 that are not accessible to the user for controlling the transport and storage of digital content and enabling service applications and upgrades that provide largely invisible support for many tasks performed by users through their endpoint devices 11.

As seen in FIG. 1, the gateway device 10 connects the various endpoint devices 11 together for enabling the user to experience a connected digital home, where information from one endpoint device 11 (for example voicemail from SIP Phone 40) can be viewed and acted on at another endpoint device 11 (for example the TV 32). The gateway device 10 thus hosts the various in-home endpoint devices 11 and facilitates the moving of information from one endpoint device 11 to another endpoint device 11. Some of the in-home endpoint devices 11 processing duties performed by the gateway device 10 include, but are not limited to, 1) detecting new devices and provide IP addresses dynamically or statically; 2) functioning as a (Network Address Translator) NAT, router and firewall; 3) providing a centralized disk storage in the home; 4) obtaining configuration files from the service management center and configuring all in-home devices; 5) acting as a registrar for SIP-based devices; 6) receiving calls from and delivering calls to voice devices, providing voicemail services; 7) decrypting and securely streaming media having digital rights management encoding; 8) distributing media to an appropriate endpoint device; 9) compressing and encrypting files for network back-up; 10) backing-up files to the service management center, to other elements within the system, or other off-site storage centers provided by third parties directly from the gateway device; 11) handling home automation schedules and changes in status; 12) providing in-home personal web-based portals for each user; 13) providing parental control services (e.g. URL filtering, etc.); 14) creating and transmitting billing records of endpoint devices 11 including, recording and uploading multi-service billing event records; 15) distributing a PC client to PCs $30a, \ldots, 30c$ in the home, used in support of the various services such as monitoring events or diagnostic agents; 16) storing and presenting games that users and buddies can play; 17) delivering context-sensitive advertising to the various endpoint devices 11; 18) delivering notifications to the endpoint devices 11; and 19) enabling remote access through the web and Instant Messaging (IM) as an example. Other duties the gateway device 10 may perform include: service maintenance features such as setting and reporting of alarms and statistics for aggregation, perform accessibility testing; notify a registration server (and location server) of the ports it is "listening" on; utilize IM or like peer and presence communications protocol information for call processing and file sharing services; receive provisioning information via the registration server; utilize a SIP directory server to make/receive calls via the SBC network element to/from the PSTN and other gateway device devices; and download DRM and non-DRM based content and facilitating the DRM key exchanges with media endpoints.

As will be described in greater detail herein below, the service management center 201 generally provides a communications and processing infrastructure for supporting the variety of application services and related communications residing at the gateway devices $10, 10_1 \ldots 10_n$. In an exemplary embodiment, this infrastructure may be configured to provide a secure environment and may be IP-based. Preferably, this support architecture is designed for high availability, redundancy, and cost-effective scaling.

The application service provider 98 in conjunction with the service management center 201, depicted in FIG. 1, manages application services for a number of gateway devices $10, 10_1 \ldots 10_n$ located at various users' premises 70. Connectivity for the various gateway devices $10, 10_1 \ldots 10_n$ to the service management center 201 and thereby the application service provider 98 is provided, in one embodiment, via a WAN termination interface, such as Ethernet WAN 53 over a broadband connection via the IP network 99, or, for example, via a wireless EvDO (Evolution Data Optimized) Internet data interface embodied as a PCMCIA (personal computer memory) wireless card 56, or a WiMax interface.

The gateway device 10 includes both a hardware and software infrastructure that enables a bridging of the WAN and LAN networks, e.g. a proxy function, such that control of any endpoint device 11 at any user premises 70 via the gateway device 10 using, optionally, a secure peer and presence type messaging infrastructure or other communications protocols, e.g. HTTPS. For example, as seen in FIG. 1, via any IM capable device or client $80a$, $80b$ respectively connected with an IM or XMPP (Extensible Messaging and Presence Protocol) network messaging infrastructure, e.g. IM networks $99a$, $99b$ such as provided by YAHOO, MICROSOFT (MSN), SKYPE, AMERICA ONLINE, ICQ, and the like, a user may access any type of functionality at a subordinate digital endpoint device 11 at and user premises 70 via the gateway devices $10, 10_1 \ldots 10_n$ and service management center 201 by simple use of peer and presence messaging protocols. In one exemplary embodiment, a peer and presence communications protocol may be used such as Jabber and/or XMPP. Particularly, Jabber is a set of streaming XML (Extensible Markup Language) protocols and technologies that enable any two entities on the Internet to exchange messages, presence, and other structured information in close to real time. The Internet Engineering Task Force (IETF) has formalized the core XML streaming protocols as an approved instant messaging and presence technology under the name of XMPP (Extensible Messaging and Presence Protocol), the XMPP specifications of which are incorporated by reference herein as IETF RFC 3920 and RFC 3921. Thus, the gateway device is provided with functionality for enabling a user to remotely tap into and initiate functionality of a digital endpoint devices 11 or the respective applications of the endpoint devices 11 at the premises via the IM networks $99a$ and $99b$.

In addition, the gateway device 10 and network connectivity to the novel service management center 201, provides, in a preferred embodiment, a secure peer and presence messaging framework, enabling real-time communications among peers via other gateway devices $10_1 \ldots 10_n$. For instance, the device 10 provides the ability to construct communication paths between peers with formal communications exchanges available between, for example, one gateway device $10_1$ at user premises $70_1$ and a second gateway device $10_n$ located at user premises $70_n$. Thus, such an infrastructure provides for content addressing, enabling peers through remote gateway devices $10_1 \ldots 10_n$ to supply and request content such as files, media content or other resources of interest to a community of interest.

Figure 2:
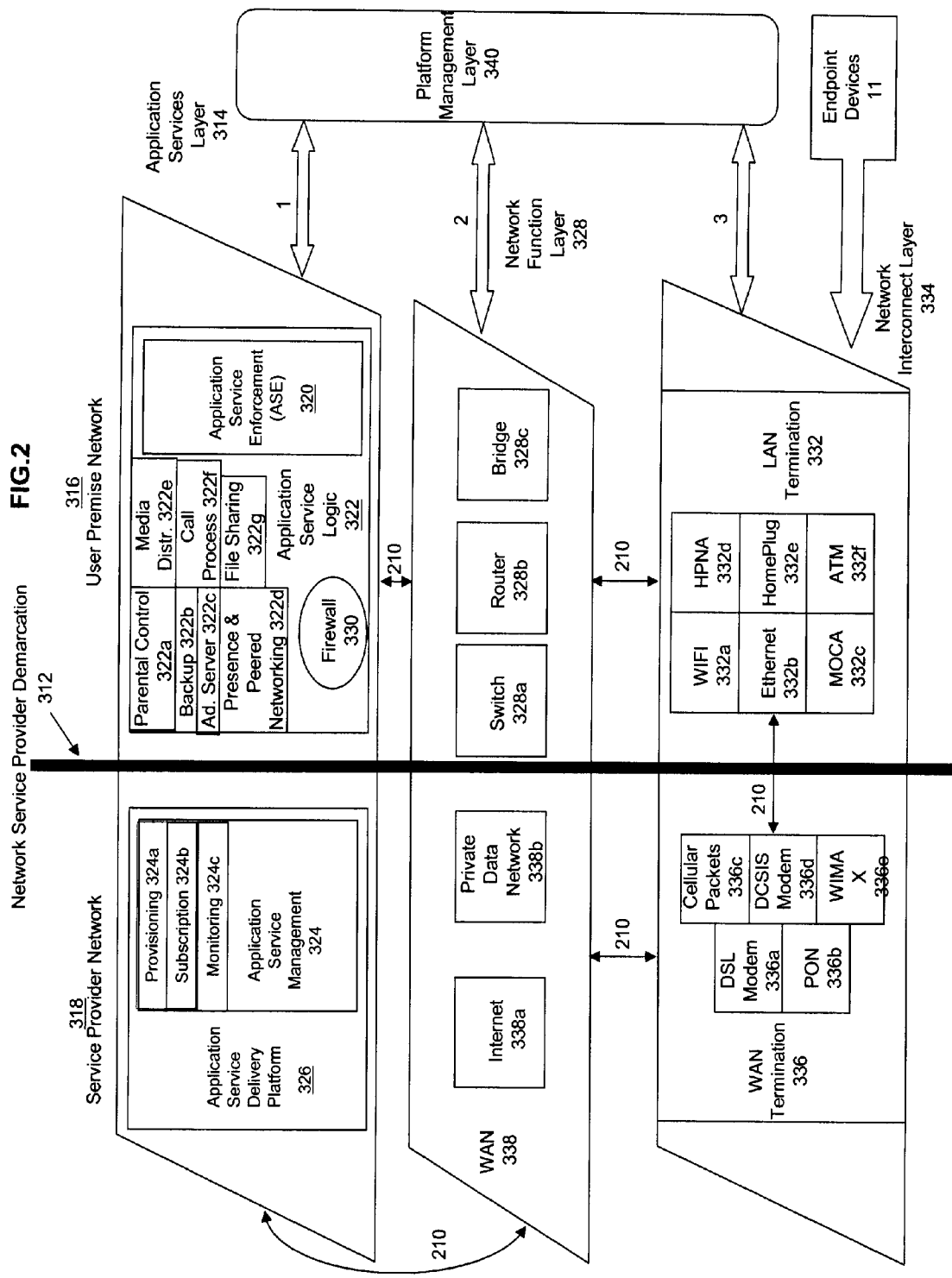
FIG. 2 is a high-level block diagram of an embodiment of the architecture of the exemplary system showing the demarcation between a gateway device and the service management center in reference to a network service provider demarcation.

To further demonstrate the novel architecture between the gateway device 10 and service management center 201 reference to FIG. 2 is now made. FIG. 2 is a high-level block diagram of an embodiment of the architecture of the exemplary system showing the demarcation between a gateway device 10 and the service management center 201 in reference to a network service provider demarcation 312. The logical network service provider demarcation 312 is formed at the edge of the wide area network at the user premises, between the wide area network and the equipment in the user premises. In a typical scenario, a network service provider takes responsibility for managing resources on the network side of the network service provider demarcation 312, leaving the user to manage everything on the user premises side. However, the gateway device 10 is implemented in such a manner as to offer its user many of the applications services, that were previously offered from network-side servers, from the user premises.

FIG. 2 shows that, in the exemplary architecture, many of these application service functionalities that were previously offered from the service provider network 318 exist across the network service provider demarcation 312 and logically reside at the application services layer 314 in the user premises network 316 on the hardware components located in the gateway device 10. In particular, the software/firmware that implements application services is logically positioned on the user premises network 316 of the network service provider demarcation 312.

The application services layer 314 shown in FIG. 2 represents the functional layers that provides access to applications services by application clients. These application services exist on a managed application service delivery platform (ASD) 326. The ASD 326 may include three functional modules, namely the application service enforcement (ASE) module 320, the application service logic (ASL) module 322, and the application service management (ASM) module 324.

On the user premises network 316 with respect to the ASD 326, the application services layer 314 includes the ASL module 322 which executes the application services that the gateway device 10 or endpoint devices 11 request. Such services may include parental control 322a, backup 322b, advertising server 322c, presence and peered networking 322d, media distribution 322e, call processing 322f, and file sharing 322g. Also, on the user premises network 316 with respect to the ASD is the ASE module 320. The ASE module 320 is responsible for enforcing the relevant application privileges to the application services. The ASE module 320 and the ASL module 322 must interact with each other so that the ASL module 322 can provide access to the client applications that have passed the policy enforcement procedures set forth in the ASE module 320. Additionally, a firewall 330 to protect the application client from application level attacks from the open Internet is located on the user premises network 316 within the application service layer 314.

Other elements shown in FIG. 2 that may reside in the gateway device 10 and logically positioned on the user premises network 316 include a network function layer 328 comprised of, but not limited to, a switch 328a, router 328b and/or a bridge 328c. The switch, router and bridge may optionally reside outside of the gateway device 10 and the functions thereof be performed elsewhere. Additionally, a LAN termination interfaces 332 located within the network interconnect layer 334 on the user premises network 316 may optionally include, but not be limited to the following interfaces: WiFi 332a, Ethernet 332b, Multimedia Over Coax Alliance (MOCA) 332c, Home Phoneline Networking Alliance (HPNA) 332d, HomePlug 332e, and Asynchronous Transfer Mode (ATM) 332f. Other interfaces currently known or to be developed may be included. The various LAN termination interfaces 332 allows bi-directional network layer communications on the user's side of the premises with one or more of the associated endpoint devices 11.

FIG. 2 also shows the WAN termination interfaces 336 at the network interconnect layer 334 on gateway device 10, but on the service provider network 318 side of the network service provider demarcation 312. The WAN termination 336 may include, but not limited to the following interfaces Digital Subscriber Line (DSL) modem 336a, Passive Optical Network (PON) 336b, cellular packets 336c, Data Over Cable Service Interface Specification (DCSIS) modem 336d, and Worldwide Interoperability for Microwave Access (WiMAX) 336e. Other interfaces now known or to be developed may be included. The WAN termination 336 provides connectivity to the wide area network (WAN) 338 at the network function layer 328 on the service provider network 318. The WAN 338 may include, but not limited to, the Internet 338a and a private data network 338b, for example. The WAN termination 336 enables bi-directional network layer communications for the associated endpoint devices 11 via a WAN and enables bi-directional communications between the gateway device 10 and the service management center 201 via the WAN.

With further reference to FIG. 2, the core of the logical capacities of the service management center 201 resides on the Service provider network 318, and is depicted as the Application Service Management (ASM) 324 portion of the application service delivery platform 326 in the application services layer 314. The ASM module 324 is implemented in the service management center 201, which is external to the user premises, and on the service provider network 318 side of the network service provider demarcation 312. The ASM module 324 may include functions such as provisioning 324a, subscription 324b, and monitoring 324c, for example.

Examples of various ASM module 324 functionalities performed at the service management center 201, from the service provider network 318 regime, include but are not limited to, initializing service in the gateway devices, providing security for the gateway devices and the network support infrastructure, enabling real time secure access and control to and from the gateway devices, distributing updates and new service options to the gateway devices, providing service access to and from the gateway devices and remote access to the gateway devices, for example. In support of these services, the service management center 201 provides the following exemplary additional services and features: authentication, multi-service registration, subscription control, service authorization, alarm management, remote diagnostic support, billing collection and management, web services access, remote access to gateway devices (e.g. via SIP or Internet/ web based communications), reachability to access challenged gateway devices, software updates, service data distribution, location service for all services, SIP VoIP service, media services, backup services, sharing services, provisioning, gateway interfaces to other service providers (northbound and peering), load balancing, privacy, security, and network protection.

The logical network architecture for the service management center network 201 delivering these capabilities is illustrated and described in greater detail in the above-identified related applications.

The ASM module 324 is operable to provide the necessary data to the ASE 320 and ASL modules 322 for them to carry out their respective functions. Specifically, the ASE module 320 receives the policies and permissions of each application client from the ASM module 324 (such as provisioning data and subscription data) and enforces those policies against the requested actions by the client application. Furthermore, the ASL module 322 may interact with the ASM module 324 for monitoring purposes and status information such as call data recording and billing. The ASM module 324 also manages the overall security and integrity of the ASD 326.

Furthermore, the ASL module 322 and ASE module 320 maintain logical connectivity or interaction with the ASM module 324 in the service management center 201, typically via communication through WAN 338. This logical connectivity is established through an always-on (or on an as needed, periodic basis), secure control channel 210 between the application services layer 314 (ASL and ASE) of the user premises network 316 and the application services layer 314 (ASM) of the service provider network 318. The control channel 210 is established through the network function layer 328 and the network interconnect layer 334. Through the control channel 210, the service management center 201 communicates with one or more of the gateway devices 10 thereby providing an infrastructure to support and/or manage the application services offered to endpoint devices 11 and their users by logic implemented in the gateway device(s). This logic is called the gateway operational management software and will be further described below. Effectively, the ASD 326, considered in its entirety, extends all the way from the service provider network 318 to the user premises network 316 by traversing the network service provider demarcation 312.

FIG. 2 also introduces a logical platform manager layer 340 to the user premises network 316, which allows for interlayer allocation of local resources. The platform manager layer 340 guarantees access between the ASL module 322 on the user premises network 316 and the ASM module 324 in the service management center 201 by assuring that the local user premises hardware and software modules are functioning at a required state (CPU and memory usage, bandwidth usage, QoS settings, etc.) in order for the ASL module 322 to have the necessary resources to establish its required communications path to the ASM module 324. Note that the ASE, ASL and ASM modules are only examples of functions that may be logically bundled; other bundles, and other means of bundling these functions, are possible.

The platform manager layer 340, seen in FIG. 2, is also responsible for implementing that part of the managed application services to be performed by the gateway device 10. In that regard, the platform manager layer 340 secures and manages the overall hardware platform, given that in this scenario, the network function layer 328 and the application services layer 314 reside on one hardware platform. This secure hardware platform provides a robust and secure operating environment for the application services layer 314. Thus, to establish a secure and robust hardware operating environment, the platform manager layer 340 must interface (represented by arrows 1, 2, and 3) with all the layers above it and allow for bi-directional operational information flow among all of the functions including application services.

Application services represent functionalities, implemented in the upper layer(s) of the protocol or logical stack above the network layer(s) that may extend up to the application layer (layer 7 of the OSI model). An application service, for example, provides application server communication with a client functionality of one or more endpoint devices, for the respective service, communicated on top of network layer communications through the interfaces. In the exemplary system, the services are provided on a subscription service basis to users at the premises. The ASE module 320 provides enforcement regarding authorization, authentication, configuration, and/or use of the respective application service via the endpoint devices 11. The application service includes service and feature functions, implemented and controlled by the ASL module 322. Management of the application service is based on communications with the ASM 324 housed within service management center 201 via the WAN 338.

Examples of application services include, but are not limited to one or more of: media delivery, content management, access control and use tracking, file sharing, and protection and back-up services of both Internet/Web-generated digital media content and user generated digital media content. The disclosed gateway 10 device thus is configured and programmed to simplify various aspects of managing the emerging home/business digital networks including the myriad of interconnected digital endpoint devices 11 associated with the gateway device 10. The endpoint devices 11 need not reside within, or be located at, the premises to maintain their association with the gateway device 10. Application service functionality of the gateway device 10, as provided by the exemplary system, is enabled/disabled and configured by an application service provider 98 (FIG. 1), via communications between the gateway device 10 and the service management center 201.

As shown by the discussion of FIG. 2, application service software/firmware is logically positioned on the user premises network 316, that is to say on the user premises side of the network service provider demarcation 312. The gateway device 10 software/firmware however, also defines a logical service provider-user demarcation between the user premises and the application service provider, as will be described in more detail with regard to FIG. 3.

Thus referring to FIGS. 1 and 2, the gateway device 10 and service management center 201 move substantial functions performed by the typical network server into the user premises by incorporating those functions in a way that allows for the server functionality to be externally managed by the service management center 201 which may be operated by a third-party service provider such as an application service provider 98. In this exemplary system, both the server functionality and the application services offered via the gateway device 10 may be managed by the service management center 201. Moreover, the server function residing in the gateway device 10 is not only located on the user premises but it now resides logically on the user premises side of the network service provider demarcation 312 and on the service provider side of the applications service provider demarcation 392 (see further discussion below in reference to FIG. 3).

Figure 3:
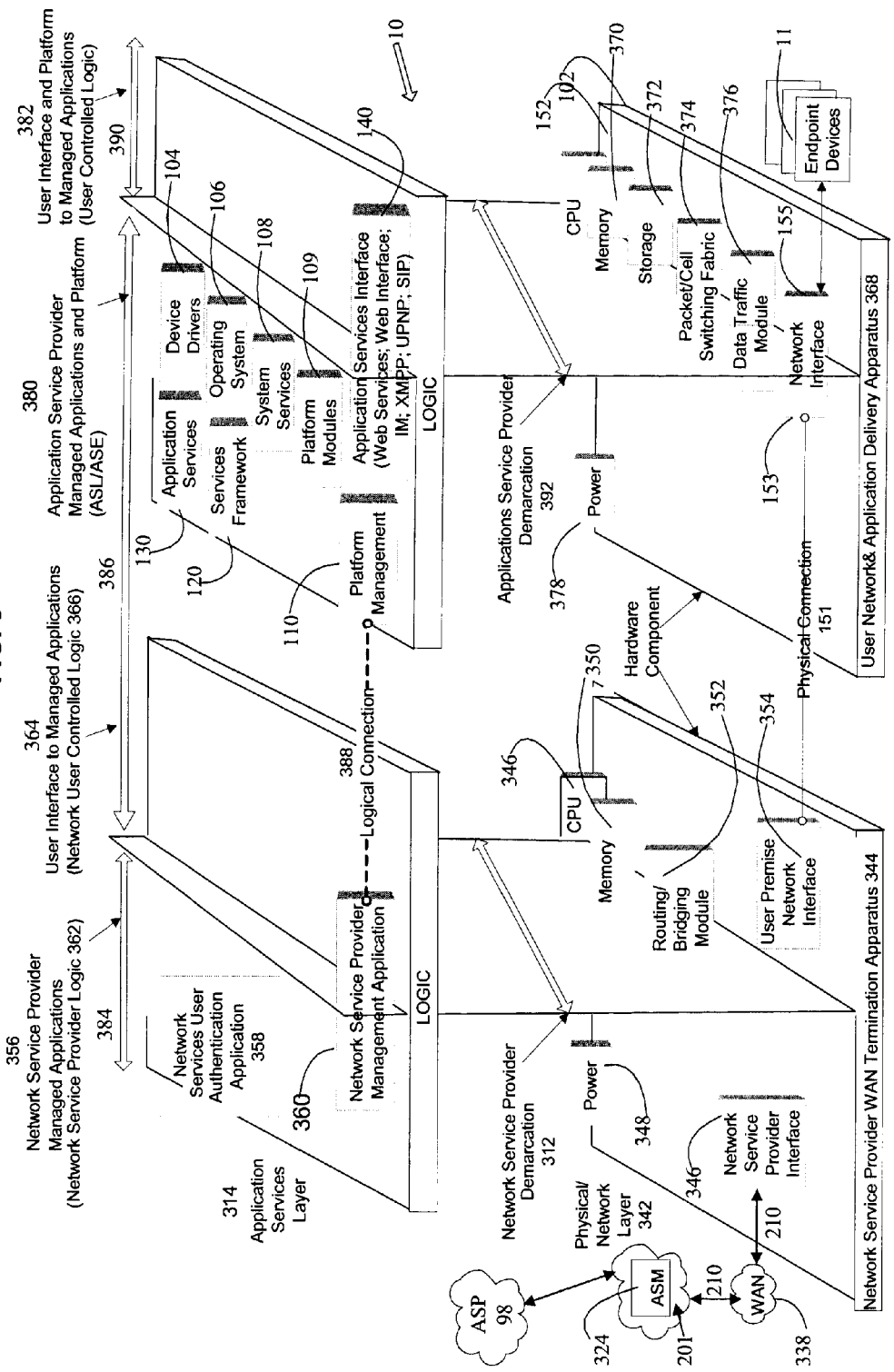
FIG. 3 is a high-level block diagram of an embodiment of the software and hardware components of a gateway device together with a network service provider termination apparatus, and shows a network service provider demarcation as well as an application service provider demarcation.

FIG. 3 is a high-level block diagram of an embodiment of the software and hardware components of a gateway device together with a network service provider termination apparatus 344, and shows a network service provider demarcation 312 as well as an application service provider demarcation 392. At the physical/network layer 342, the drawing shows an example of user premises hardware components required for delivering data services (i.e. Internet connectivity) along with a separate, non-integrated managed hardware used in delivering a set of managed application services (e.g. IM, VOD, IP telephony). The Network Service Provider Wide Area Network Termination Apparatus (NSP-TA) 344 allows for a typical termination of WAN 338 at a network service provider interface 346 for such services as DSL, cable, and fiber. Additional components within the NSP-TA 344 may include a CPU 346, power 348, memory 350, routing/bridging module 352, and a user premises network interface 354, for example. The NSP-TA 344 may be an existing user-premises device, provided by the carrier supplying network services to the premises. FIG. 3 also depicts the network service provider demarcation 312 at the hardware level.

In order for network service providers to deliver managed services, they typically require a management element controlled by the CPU 346 on the NSP-TA 344. To depict these logical elements residing on the hardware components, FIG. 3 includes a representation of the application services layer 314 above the physical/network layer 342. This layer corresponds to the application services layer 314 of FIG. 2, but without reference to any logical elements residing at the network services provider. The management element, represented by the network service provider managed application 35b, allows the network service provider to determine the status of the network hardware device and interfaces as well as maintain a certain degree of security enforcement at the customer premises.

As noted, the network service functionality is at the network interconnect layer 334 and network function layer 328 (displayed in FIG. 2) and generally does not extend to the application services layer 314 beyond basic authentication, authorization and state management as depicted by network services user authentication application module 358. As with the hardware components, the logical elements also have a network service provider demarcation 312. On the WAN side, depicted as the network service provider managed applications 35b side, of the network service provider demarcation 312, resides within the network service provider management application module 360 the applications that are managed by the network service provider logic 362. The network service provider logic 362 allows the network service provider the exclusive control over the applications within the portion of the network service provider management application module 360 that are logically on the network service provider managed applications 35b side.

The user interface to managed applications 364 is present on the LAN side of the network service provider demarcation 312 within the application services layer 314. Within this interface resides software/firmware and logic available to users other than the network service provider referred to as the network user controlled logic 366. The network user controlled logic 366 provides a user interface to the network service provider logic 362 and, to the extent permitted by the network service provider logic 362, interaction with or communication between the user and network service provider through the network user controlled logic 366 and the network service provider logic 362, and to the NSP-TA 344 hardware components. The network user controlled logic 366 allows the user of the NSP-TA 344 to make certain minimal software/firmware changes relevant to their preferences (e.g., user name and password changes, local IP addresses changes, local interface selection). All user devices typically can only communicate with the NSP-TA 344 through one or more of the user premises network interfaces 354. The user can modify the network user controlled logic 366 through the user premises network Interface 354. The network service provider demarcation 312 is typically within the NSP-TA 344, logically dividing the network service provider interface 346 and the user premises network interface modules 354. The network service provider does not have any in-depth visibility or significant responsibility beyond the network service provider demarcation 312.

Additionally, shown on the right hand side of FIG. 3 is the User Network and Application Delivery Apparatus (UNA-DA) 368, which is depicted as a separate managed gateway device 10 (but as described below may optionally be combined with elements of the NSF-TA 344) that a managed-service provider (which may be different than the network service provider) would control in delivering a set of application services to the user premises 70 (FIG. 1). FIG. 3 illustrates the logical architecture of the software and hardware of the gateway device 10 together with a NSP-TA 344 for broadband connection to WAN 338. The gateway device 10 is an application delivery apparatus, for delivering application services to endpoint devices 11 using network layer communications through the network interface 153. FIG. 3 also illustrates two relevant demarcations and a termination which delineate control/management access with respect to the functionalities of the gateway device 10. To be described further below, FIG. 3 shows the arrangement of the ASL module 322 and the ASE module 320 of FIG. 2 as being logically positioned between these two demarcations which results in significant management control by the application service provider 98 and relieve the user of significant burdens in arranging and configuring the systems/services at the user premises 70 (FIG. 1).

With respect to the two demarcations 312 and 392 shown in FIG. 3, one of the demarcations as outlined above is the network service provider demarcation 312. To identify the separation of, and distinguish between, the software/firmware and hardware components subject to control by the application service provider 98 and those subject to control by the user at the user premises, FIG. 3 identifies a dividing line across the logical elements of the UNA-DA 368, and a corresponding dividing line across hardware components, referred to as the applications service provider demarcation 392. The arrows at the top of FIG. 3 thus show the delineations in management responsibility created by the two logical demarcations 312 and 392. The covered area to the left of the network service provider demarcation 312 as depicted by arrow 384 is the network service provider's responsibility. By contrast, the area covered by arrow 390 which represents anything to the right of the application service provider demarcation 392 is the end user's responsibility. However, the logic and hardware between these two demarcations, as depicted by arrow 386, is the application service provider's 98 responsibility. This arrangement of two demarcations and the attendant logical demarcations in management access to the hardware resources at the premises result in significant management control by the application service provider 98 and relieve the user of significant burdens in arranging and configuring the systems/services at the premises.

It should be noted that the logical connection 388 between the network service provider management application 360 and the platform management 110 may be provided to the NSP-TA 344 to enable the application service provider 98 to assume any user's responsibility in managing the network user control logic 366 of the NSP-TA 344. Therefore, the end user would no longer be responsible for managing any element with respect to the NSP-TA 344.

Referring to FIG. 3, the managed gateway device 10 is composed of several elements at both the physical/network layer 342 and the application services layer 314. At the physical/network layer 342, the device 10 includes its own dedicated CPU 152, memory 370, packet/cell switching fabric 374, data traffic module 376 and power 378 as well as its own dedicated set of interfaces. The UNA-DA 368 includes one or more network interfaces 153 providing connectivity to the NSP-TA 344 as well as to user premises endpoint devices 11. One skilled in the art will readily recognize, however, that the physical connection 151 that connects the UNA-DA 368 to the NSP-TA 344 also provides connectivity for the UNA-DA 368 to the WAN 338, and is the means by which the UNA-DA 368 accesses the WAN 338.

Programming elements of the UNA-DA 368 in the gateway device 10 are depicted at the application services layer 314 of the UNA-DA 368. The software/firmware corresponding to the ASL module 322 and the ASE module 320 of FIG. 2 reside on the application service provider managed applications and platform 380 (FIG. 3). The application service provider managed applications and platform 380 is managed by the managed application service provider 98 in conjunction with the service management center 201 housing the ASM module 324. The application service provider 98 accesses the application service provider managed applications and platform 380 by means of control channel 210 through the WAN 338.

Other logical elements that form the application service provider managed applications and platform 380 include, but are not limited to, device drivers 104, operating system 106, system service 108, and platform module 109. These logical elements are described with respect to FIGS. 4A and 4B below. Another logical element that forms the application service provider managed applications and platform 380 includes the application service interface 140. The application service interface 140 enables communications from user endpoint devices 11 with the application service provider managed applications and platform 380.

The application service provider managed applications and platform 380 includes a platform management module 110 that, with other software/firmware in the platform and the ASM 324, allows the managed application service provider 98 to control the hardware elements of the UNA-DA 368 in addition to other relevant application services logic or hardware that may reside on the user premises. For example, this software/firmware enables a managed application service provider 98 to control and manage the hardware elements on the UNA-DA 368 to ensure proper use and allocation of the UNA-DA's processing, memory, storage, and bandwidth, to monitor local hardware security and generate needed alarms or protection sequences, and to prioritize applications based on a set of established policies. The user would have control over specific parameters of application services obtained through the UNA-DA 368, through the user interface and platform to managed applications 382 shown in FIG. 3. These parameters allow the user to control the local behavior of the interfaces and to configure the specific applications to implement the user preferences for those applications.

The application service provider 98 can interact with the network service provider's managed applications through the network service provider management application 360. This is an optional function but it helps show how the gateway device 10 can interface with a network device, such as the NSP-TA 344, from a network service provider, and provide a unified application interface. The logical connection 388 represent this management relationship between platform management logic module 110 in the gateway device 10 and the network service provider management application 360 in the NSP-TA 344. In effect, the application service provider 98 manages the NSP-TA 344 for the user, even though it is not the application service provider's hardware. In the case where the application service provider is a network service provider as well, then it would work in practically the same way. If the NSP-TA is the application service provider's own hardware, the degree of integration and control can be elevated even more.

FIG. 3 also shows how the software/firmware elements on the gateway device 10 effectively partitions the hardware at the application service provider demarcation 392, which gives the application service provider 98 the ability to provide a managed Peer-to-Peer private service that will enable that provider to use the gateway device 10 for performing distributed computing, search, indexing, file backup, sharing, etc., all managed and controlled by the application service provider 98 through service management center 201.

In another embodiment, the two hardware regimes described above (NSP-TA 344 and the UNA-DA 368) may be combined into one managed hardware platform. This would in effect replace the "user" access with a managed "machine" access, for aspects of the NSP-TA 344, as well as aspects of the application services offered through the UNA-DA 368. Thus, the combination creates an integral gateway device 10 providing both network service and application services, under centralized management. Although integrated, network interconnect functions of the NSP-TA 344 may still be managed by the network service provider, as in the example of FIG. 3. Those skilled in the art will readily see additional suitable combinations and configurations for the hardware comprising the NSP-TA 344 and the UNA-DA 368. For example, in a further embodiment, all the hardware dedicated to the network service provider interface 346 may reside and be integral with the hardware comprising the UNA-DA 368. Thus, the network service provider interface 346 may reside on the UNA-DA 368.

Figure 4A:
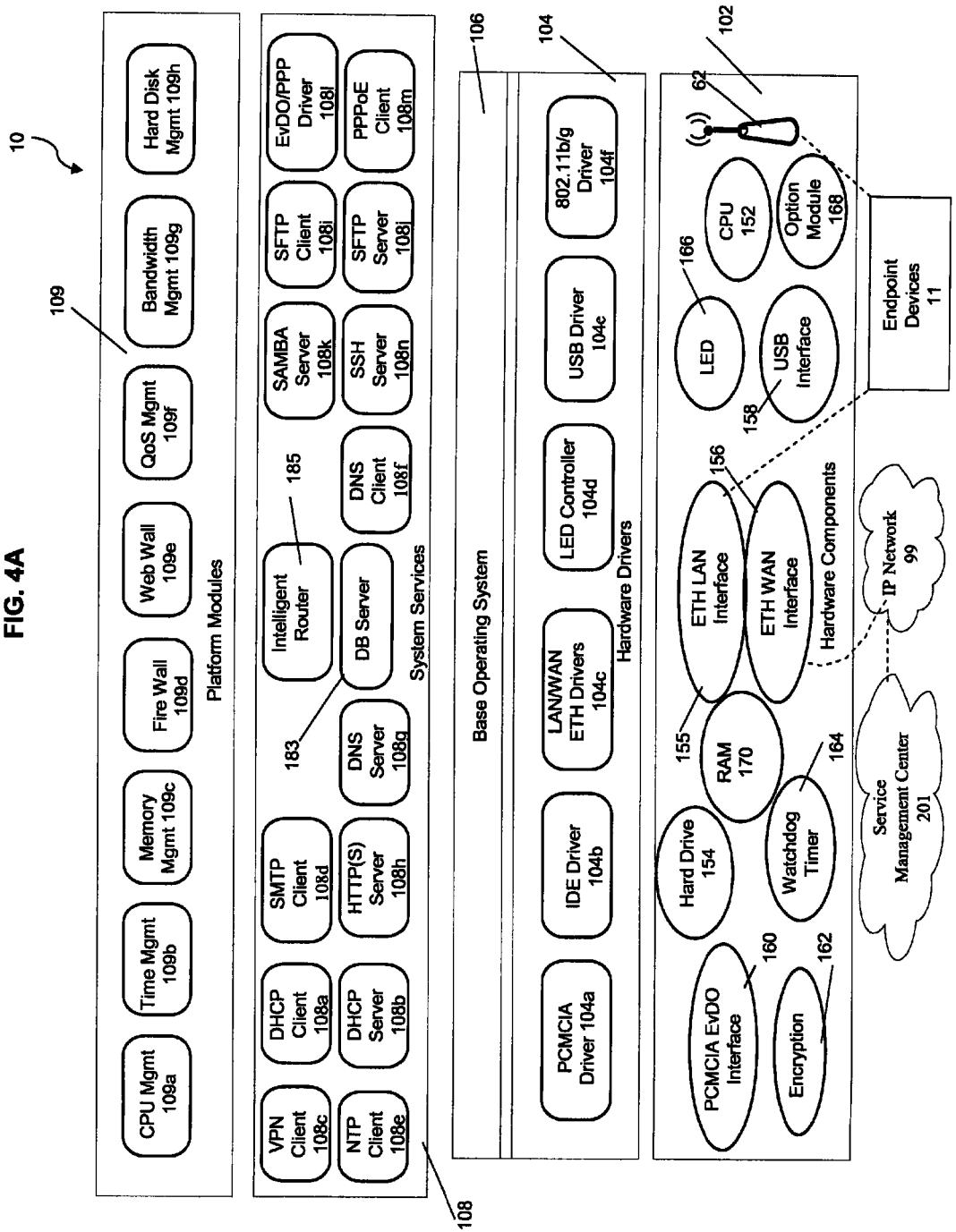
FIGS. 4A and 4B are more detailed logical diagrams of an embodiment of an exemplary gateway device.
Figure 4B:
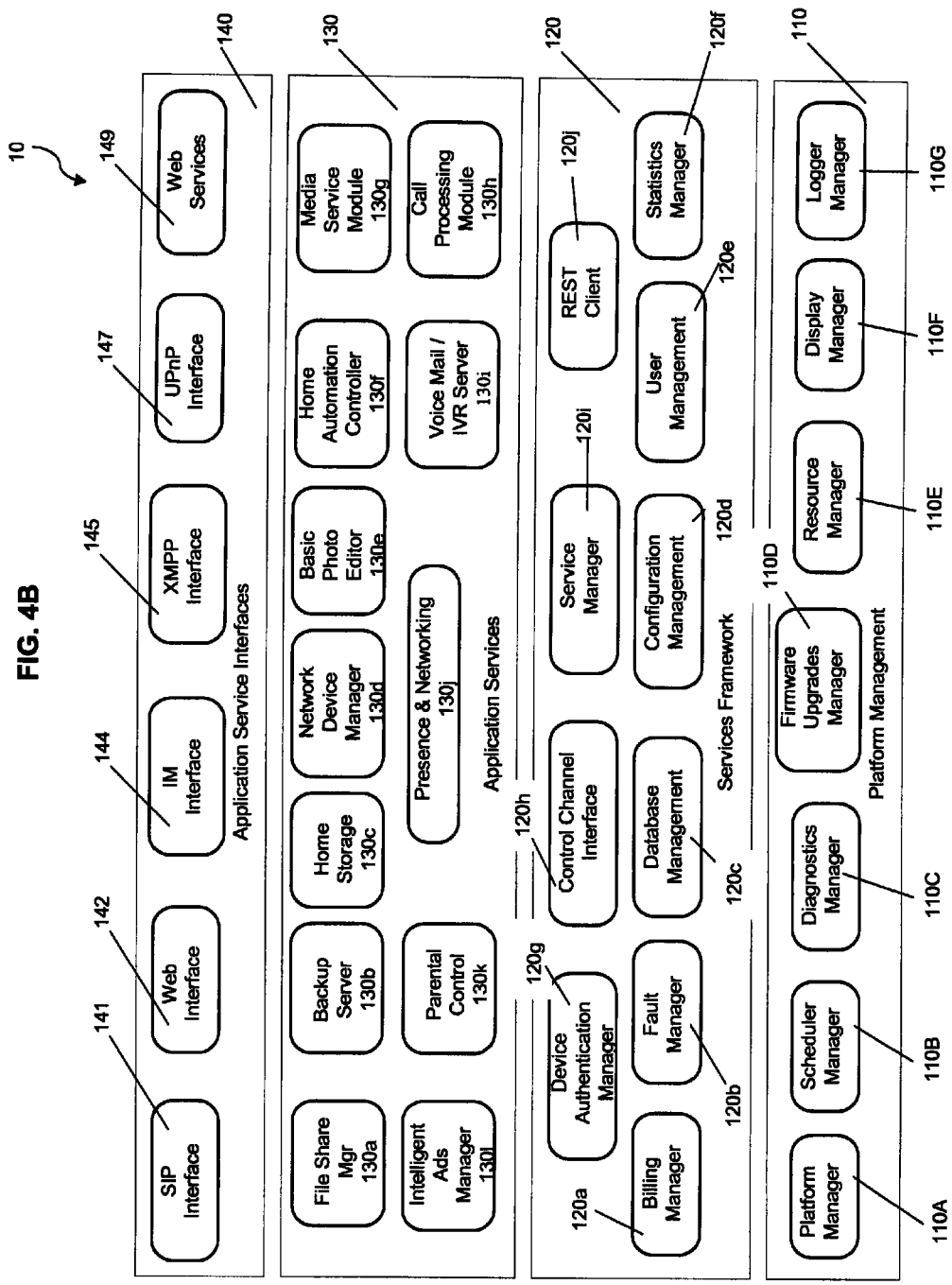

The composition of the premises gateway device 10, earlier described with reference to FIG. 3, is now described in greater detail with reference to FIGS. 4A and 4B. FIGS. 4A and 4B are more detailed logical diagrams of an embodiment of an exemplary gateway device 10. As shown in FIGS. 4A and 4B, the gateway device 10 utilizes a layered architecture, which enables the encapsulation of similar functionality and the minimization of dependencies between functions in different layers. FIG. 4A shows the lower portion of the layered architecture, and FIG. 4B shows the upper portion of the layered architecture. The completed set of layers can be conceptualized as if FIG. 4B was combined with FIG. 4A, with the layers of FIG. 4B above those of FIG. 4A. FIGS. 4A and 4B also depict exemplary functionality (hardware and logical) resident in each of the layers.

The layered architecture includes, but not limited to, a hardware components layer 102, hardware driver layer 104, base operating system layer 106, system services layer 108, platform modules layer 109, platform management layer 110, services framework layer 120, application services layer 130, and application services interfaces layer 140. These layers combined represent the layered architecture of the exemplary gateway device 10.

An overview of FIGS. 4A and 4B made in reference to FIGS. 2 and 3 is provided for orientation purposes. The logical elements of the network interconnect Layer 334 residing on the gateway device 10 (FIG. 2) are found in the hardware drivers layer 104 in FIG. 4A, which govern the operation of the hardware components layer 102. The processor runs a base operating system shown in FIG. 4A at layer 106, which plays a role in each of the network interconnect 334, network function 328, application services 314 and platform manager layer 340 (FIG. 2). Logical elements represented by the network function layer 328 (FIG. 2) comprise elements from the system services layer 108 (FIG. 4A). In a similar fashion, the platform manager layer 340 (FIG. 1) is implemented in the exemplary architecture of FIGS. 4A and 4B by the platform modules 109 and the platform management layer 110. Particular logical elements comprising the ASL module 322 and ASE module 320 of the application services layer 314 (FIG. 2) are shown in FIG. 4B as comprising logical elements from each of services framework 120 and application services 130. The layered architecture displayed in FIG. 4B facilitates reuse or sharing of logic across the layers to provide a managed services framework 120. Finally, application services interface 140 enables communications from user endpoint devices 11 (FIG. 1) within their respective service environments.

As shown in FIG. 4A, the hardware components layer 102 includes a central processing unit (CPU) 152, which may be a system on a chip that includes processing elements, digital signal processor resources and memory. The implementation of functions and the related control such as a router (with quality of service (QoS)), firewall, VoIP gateway, voice services and voice mail may be embodied and performed within the CPU 152.

The CPU 152 is also coupled to a random access memory (RAM) 170 and additionally, non-volatile hard drive/disk magnetic and/or optical disk memory storage 154. Generally, the hard drive/disk magnetic and/or optical disk memory storage 154 provides non-volatile storage of computer readable instructions, data structures, program modules, objects, service configuration data and other data for use by the gateway device 10. The non-volatile hard drive/disk magnetic and/or optical disk memory storage 154 may be partitioned into a network side which is the repository for storing all of the service logic and data associated with executing services subscribed to by the user, and, is invisible to the user, and, a user side for storing user generated content and applications in which the user has visibility. Although not shown, the CPU 152 may be coupled to a microcontroller for controlling a display device and/or other devices.

Additional hardware components include one or more Ethernet LAN and WAN interface cards 155, 156 (e.g. 802.11, T1, T3, 56 kb, X.25, DSL or xDSL) which may include broadband connections (e.g. ISDN, Frame Relay, ATM, Gigabit Ethernet, Ethernet over SONET, etc.), wireless connections, or some combination of any or all of the above. For wireless connections, the cards would be associated with WiFi LAN access point 62 to enable a wireless connection. The Ethernet LAN interface 155 provides data communication connectivity within the user premises, essentially, for communication with any endpoint devices operating within the premises. The Ethernet WAN interface 156 provides data communication connectivity for the gateway device 10 and endpoint devices 11 (not shown) communicating through the device 10, with the wide area network like IP network 99 shown in FIG. 1.

For additional or alternative customer premises communications, the hardware components 102 may also include one or more USB interfaces 158. Furthermore, for additional or alternative communications with the wide area network, the hardware components may also include the PCMCIA EvDO interface card 160.

A data encryption/decryption unit 162 is additionally provided as part of the architecture for providing data security features. A watchdog timer element or like timer reset element 164 is provided as is one or more LED devices 166 for indicating status and other usable information to users of the gateway device 10.

The hardware layer 102 may also include an option module 168. The hardware components at layer 102 have multiple interfaces for connection to such an option module 168. These interfaces, by way of example, could be a data bus (e.g. PCI, etc), network interface (e.g. Ethernet (RJ45), MoCA/HPNA (Coax)) and Power feeds. The option module 168 allows additional functionality to be added to the gateway device 10 at the hardware layer 102. For example, this additional functionality could be everything from support for a variety of extra WAN interfaces (e.g. xDSL, DOCSIS, Fiber (PON), cellular packet, WiMAX, etc.), media processing (e.g. Cable TV termination, Digital Video Recording, Satellite TV Termination, over-the-air broadcasting, etc), to voice processing (FXS, FXO, Speech Detection, Voice to Text, etc). The option module 168 may have its own standalone CPU, memory, inputs/outputs, storage, or provide additional functionality by its use of the CPU, memory, inputs/outputs, and storage facilities off of the other hardware layer 102 components. The option module 168 may be managed indirectly by the platform manager layer 340 (FIG. 2).

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

As further shown in FIG. 4A, the hardware drivers layer 104 comprises a multitude of driver interfaces including but not limited to: a PCMCIA driver 104a, for enabling low level communication between the gateway CPU 152 and the PCMCIA network interface card wireless interface, an IDE driver 104b for enabling low level communication between the gateway CPU 152 and the local mass memory storage element, and LAN/WAN Ethernet drivers 104c for enabling low level communication between the gateway CPU 152 and the respective network interface cards 155 and 156. The exemplary driver layer also includes, but not limited to an LED driver/controller 104d for driving LED(s) 166, a USB driver 104e allowing CPU 152 to communicate via USB interface 158, and an 802.11 b/g (or n) wireless network driver 104f for allowing the CPU 152 to communicate via the WiFi LAN access point 62. The drivers provide the logical connectivity between the low level hardware devices 102 and the base operating system 106.

The base operating 106 controls the execution of computer programs and provides scheduling, input-output control, file and data management, memory management, and communication control and related services for the gateway device 10. With respect to the base operating system 106, the gateway device 10 architecture may support any embedded operating system, any real-time operating system, any open source operating system, any proprietary operating system, or even any operating systems for mobile computing devices as long as the operational needs of the client discussed herein below can be met. Exemplary operating systems that may be employed include WINDOWS, MACINTOSH, LINUX or UNIX or even an embedded Linux operating system. For instance, the gateway device 10 may be advantageously provided with an embedded base operating system 106 that provides operating system functions such as multiple threads, first-in first-out or round robin scheduling, semaphores, mutexes, condition variables, and message queues, for example.

Built upon the base operating system 106, as shown in FIG. 4A, is a system services support layer 108 providing both client-like and server-like functions that enable a wide range of functionality for the types of services capable of being managed by the gateway device 10. For instance, a Dynamic Host Configuration Protocol (DHCP) client 108a and server 108b software modules are provided. The DHCP client particularly requests via a UDP/IP (User Datagram Protocol/Internet Protocol (e.g., IPv4, IPv6, etc.) configured connection information such as the IP address that the gateway device 10 has been dynamically assigned by a DHCP service (not shown), and/or any the subnet mask information the gateway device should be using. The DHCP server dynamically assigns or allocates network IP addresses to subordinate endpoints 11 on a leased basis. A Virtual Private Network (VPN) client 108c may communicate via a proxy server in the service management center 201, according to a VPN protocol or some other tunneling or encapsulation protocol. An SMTP client 108d handles incoming/outgoing email over TCP, in accordance with the Simple Mail Transfer protocol. A Network Time Protocol (NTP) 108e (RFC 1305) generates and correlates timestamps for network events and generally provides time synchronization and distribution for the Internet. A Domain Name Server (DNS) client 108f and server 108g combination are used by the IP stack to resolve fully-qualified host or symbolic names, i.e. mapping host names to IP addresses.

An HTTP(S) server 108h handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client 108i and server 108j combination govern the ability for file transfer over TCP. A SAMBA 108k server is an open source program providing Common Internet Files Services (CIFS) including, but not limited to file and print services, authentication and authorization, name resolution, and service announcement (browsing). An EvDO/PPP driver 108l includes a Point-to-Point Protocol (PPP) daemon configuration for wireless broadband services. A PPPoE (Point-to-Point Protocol over Ethernet) client 108m combines the Point-to-Point Protocol (PPP), commonly used in dialup connections, with the Ethernet protocol. The PPPoE client 108m supports and provides authentication and management of multiple broadband subscribers in a local area network without any special support required from either the telephone company or an Internet service provider (ISP). The gateway device 10 is thus adapted for connecting multiple computer users on an Ethernet local area network to a remote site through the gateway 10 and can be used to enable all users of an office or home to share a common Digital Subscriber Line (DSL), cable modem, or wireless connection to the Internet. A Secure Shell or SSH 108n server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 108 is intelligent routing capability provided by an intelligent router device 185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway device 10. A central database server 183 handles all of the database aspects of the system. For example, the database server 183 maintains and updates registries and status of connected digital endpoint devices 11 (FIG. 1), maintains and updates service configuration data, services specific data (e.g. indexes of backed-up files, other service specific indexes, metadata related to media services, etc.) and firmware configurations for endpoint devices 11 (FIG. 1). The database server 183 may also store billing and transaction detail records and performance diagnostics. The database server logic 183 also satisfies all other database storage needs as will be described in greater detail herein.

Built on top of the system services layer 108 is the platform module layer 109 as seen in FIG. 4A. The platform module layer 109 provides a software framework for base operating system layer 106 and communications level platform functionality such as CPU management 109a, timer management 109b, memory management functions 109c, a firewall 109d; a web wall 109e for providing seamless WWW access over visual displays via access technologies enumerated herein, (e.g., HTTP, SMS (Short Messaging Service) and WAP (Wireless Access Protocol)), QoS management features 109f, bandwidth management features 109g, and hard disk drive management features 109h.

The layered architecture further provides a platform management layer 110 as shown in FIG. 4B, which together with the platform modules 109 implement the platform manager layer 340 discussed earlier (FIG. 2). In the layered architecture, the platform management layer 110 and elements shown above it in FIG. 4B are built upon the platform modules 109.

The features and functions in platform management layer 110 include a platform manager module 110a which will implement unique rules based notification services. On operational failure, for example, when one of the components or services fails, the platform manager module 110a would detect this failure and take appropriate action such as implement a sequence of rules to provide notification to a user. Another module within platform management layer 110 is a scheduler manager module 110b. Scheduler manager module 110b manages scheduled device maintenance, managing scheduled services, e.g. back-up services, etc. The layer 110 also includes a diagnostics manager module 110c and a firmware upgrades manager module 110d for managing firmware upgrades. A resource manager module 110e manages system resources and digital contention amongst the various resources (e.g. CPU/bandwidth utilization) within platform management layer 110. A display manager module 110f and a logger manager module 110g store and track gateway log-in activity of users and applications, e.g. voice call logs, at the user premises.

The platform management layer 110 in concert with resource manager module 110e and the platform manager module 110a enforce the separation of network-side managed service control and user-side delegations depending upon service subscriptions and configurations. For example, the platform manager module 110a and resource manager module 110e encompass rules and guidelines provided according to subscribed services that act to enforce, manage, and control the input/output operations and use of hard drives space. Thus, the operation of the platform manager module 110a and resource manager module 110e help to determine the line between what is "owned by" the customer and what is "owned by" the application service provider thereby establishing the application service provider demarcation 392 as seen in FIG. 3.

In general, the logical platform management layer 110 allows for inter-layer allocation of local resources. This function guarantees access between the application services/management logic implemented at the higher layers of the architecture within the gateway device 10 and the applications service management function in the service management center 201, by assuring that the local user premises hardware and software modules are functioning at a required state (CPU and memory usage, bandwidth usage, QoS settings, etc.). The platform management layer 110 is also responsible for implementing that part of the managed application services to be performed by the gateway device 10. In that regard, the platform management layer 110 secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer 110 must interface with all the layers above it and allow for bi-directional operational information flow among all of the functions.

Referring back to FIG. 4B, built on top of the platform management layer 110 is the Services Framework Layer 120, which provides a library of application support service processes that facilitate data collection and data distribution to and from the endpoint devices (FIG. 1). The application support service processes include, but are not limited to, a device authentication manager 120g for use in authenticating devices connected to the gateway device and the user of the gateway device, a billing manager 120a for collecting and formatting service records and service usage by endpoint devices, (e.g., calls, back-up services etc.), a fault manager 120b for detecting and managing determined system and/or service faults that are monitored and used for performance monitoring and diagnostics, a database manager 120c, a control channel interface 120h via which the gateway initiates secure communications with the operations support infrastructure, a configuration manager 120d for tracking and maintaining device configuration, a user manager 120e, a service manager 120i for managing service configuration and firmware versions for subscribed services provided at the gateway device, and a statistics manager 120f for collecting and formatting features associated with the gateway device. Statistics may relate to the use of one or more services and associated time-stamped events that are tracked. Finally, the layered service architecture shown in FIG. 4B additionally provides the gateway device 10 with intra-process communication and inter-process communication amongst the many services and modules in the service framework layer 120 that enables the provisioning, management and execution of many applications and services at the application services layer 130.

As seen in FIG. 4B, next to the Services Framework layer 120 is the application services layer 130 providing library of user application services and application support threads including, but not limited to, file share manager 130a, backup server 130b, home storage 130c, network device manager 130d, basic photo editor 130e, home automation controller 130f, media services module 130g, call processing module 130h, voice mail and interactive voice response (IVR) server 130i, presence and networking 130j, parental control 130k, and intelligent ads manager 130l.

The gateway device 10, shown in FIG. 4B, further provides application service interfaces 140 that are used to enable a variety of user applications and communications modalities. Furthermore, the application service interfaces 140 enable communications from user endpoint devices 11 (FIG. 1) within service environments. In that regard, the application service interfaces 140 enable the application services 130 to act as an appropriate server with respect to client device application or service functionality of the endpoint devices 11 (FIG. 1). The application service interfaces 140 also enable corresponding interfaces for the application services with aspects of service environments implemented outside the user premises. In that regard, the interfaces 140 enable the application services layer 130 to act as an appropriate client, for extending the application or service related communications to a server accessed via a wide area network, such as a server of the service management center 201 (FIG. 1).

Specific application service interfaces 140 might include a Session Initiation Protocol (SIP) Interface 141. SIP interface 141 is an interface to the generic transactional model defined by the session initiation protocol that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a session border controller element in the service management center 201 (FIG. 1).

Additionally, application service interfaces layer 140 may include the web interface 142 that enables HTTP interactions (requests and responses) between two applications. Also, the Web services interface 149 that provides the access interface and manages authentication as gateway device 10 access the service management center 201 via web services may be included in the application service interface layer 140. The IM Interface 144, which can optionally be located within the application service interface layer 140, is a client that enables the gateway device 10 to connect to one or more specific IM network(s). As further shown in FIG. 4B within the application service interface layer 140, the UPnP (Universal Plug and Play) interface 147 enables connectivity to other stand-alone devices and PCs from many different vendors.

The XMPP interface 145, within the application service interface layer 140, is provided to implement the protocol for streaming (XML) elements via the gateway device 10, in order to exchange messages and presence information in close to real time, e.g. between two gateway devices. The core features of XMPP interface 145 provide the building blocks for many types of near-real-time applications, which may be layered as application services on top of the base TCP/IP transport protocol layers by sending application-specific data qualified by particular XML namespaces. For example, the XMPP interface 145 provides the basic functionality expected of an IM and presence application that enable users to perform the following functions including, but not limited to, 1) exchange messages with other users, 2) exchange presence information with other devices, 3) manage subscriptions to and from other users, 4) manage items in a contact list (in XMPP this is called a "roster"), 5) block communications to or from specific other users by assigning and enforcing privileges to communicate and send or share content amongst users (buddies) and other devices, and 6) communicating with applications in the service management center and vice versa. The synchronization of allowed services and features and the real-time notification of service and configuration changes can be communicated through this interface.

Within the novel architecture of the exemplary system (FIG. 1), the gateway device 10 is enabled to aggregate all types of media, such as real time broadcast media, Internet-based streamed media, pull and push video-on-demand, or to aggregate and distribute personal media located on the user premises. The disclosed invention is directed to the ability of the exemplary system to obtain/acquire media content and/or associated metadata, to store and aggregate that content and/or metadata, and then efficiently distribute or access the content for streaming to endpoint devices 11 associated with, and managed by, the gateway device 10.

An end user has many endpoint devices 11 at their user premises that, for example, provide access to music, movies, photos, and other forms of media and their associated metadata. In addition, a user, via an endpoint device 11, can access additional media and metadata outside of the user premises, for example, through the Internet, satellite services, and other terrestrial mechanisms. This invention provides a system and methods to manage the multiplicity of media storage devices and sources in a way that provides a centralized, logical view of all media and corresponding metadata available to the user.

One key component of this invention is the Digital Media Server (DMS) that can provide access to find, collect, aggregate, store, and share digital media such as, but not limited to, music, movies, photos, and/or any other media data file via endpoint devices 11 and gateway devices 10 within the exemplary system (FIG. 1) and/or online services. Furthermore, the DMS has media management capabilities including a media manager. A DMS may be implemented either as a standalone device, or as firmware/software running on a gateway device 10 or endpoint device 11.

Another key component to this invention is a Digital Media Adapter (such as DMA 35b of FIG. 1), which browses and plays media that resides on one or more DMS devices. The DMA 35b allows the user via an endpoint device 11, such as television display devices 32 (FIG. 1), to browse media that is stored on the DMS by presenting icons and navigation artifacts as a series of "pages" (i.e. menus) that are displayed on the television display devices 32, for example. The media that the DMA 35b is accessing on the DMS includes metadata. Metadata is information that describes the content, quality, condition, origin, and/or other characteristics of the media content or other pieces of data. Examples of metadata include: actor, album, artist, artwork count, author, bit rate, composer, comment, conductor, content rating, copyright information (such as for DRM), date, date added, date modified, description, duration, director, encoded by, ensemble, kind, genre, information, graphical elements (album art, for example), keywords, language, location, location of media, license, name, organization, parental control parameters, play count, play date, play date UTC, performer, producer, rating, resolution, sample rate, size, software, source, source media, title, track count, track number, track type, total time, track ID, type, user tag data, URL, year, year of publication, year of release, and other data downloaded from the Internet. The DMS is responsible for finding, collecting, aggregating, storing and managing the metadata associated with the media. It should be noted that the DMA functionality may be implemented either as a standalone device, or as firmware/software running on a gateway device 10 or endpoint device 11.

Within the exemplary system of FIG. 1, the gateway device 10 may serve as both a DMA and a DMS. The gateway device 10 may be given the capabilities of a DMA device and/or DMS device, such as for example, the functionalities of media and metadata collection, aggregation and distribution by adding media content processing capabilities. These may include, for example: (a) video encoding/decoding/transcoding by way of hardware/firmware; (b) media management, such as firmware/software that permits metadata and media file aggregation, organization, and distribution; and (c) digital rights management (DRM), such as decrypting/encryption, and transcription, and the secure handling of media files on a secure hardware platform. The DMA and DMS functions can be added in whole or in part to the gateway device 10 to achieve a desired service definition. Therefore, it is not necessary to implement all functions concurrently. Furthermore, there may be more than one endpoint device 11, gateway device 10, or other device within the exemplary system serving as a DMA or DMS. In the preferred embodiment, the overall implementation takes into account the possible inclusion of all such capabilities at some point.

FIG. 5 is a high-level architectural overview of an exemplary system to manage the multiplicity of media storage devices and sources in a way that provides a centralized, logical view of all media and corresponding metadata available to the user. For exemplary purposes, the gateway device 10 is acting as a DMA and the DMS. As previously described with reference to FIG. 1, the gateway device 10 is connected to the IP network 99, for example, and to various endpoint devices 11 via a LAN connection 60. Through the IP network 99 the gateway device 10 has access to media and the associated metadata on servers residing within the service management center 201, application service provider 98, and or any other entity that is accessible through the exemplary system depicted in FIG. 1. Specifically, the media sources 500 (via the IP network connection, the WAN connection 338 (FIG. 2), and the option module 168 (FIG. 4) allow the gateway device 10 to receive media and the associated metadata from sources within and beyond the user premises, for example, the Internet, satellite television providers, other real-time video providers, media associated with other gateway devices 10 on other user premises, etc.

The connections to LAN 60 and the WAN 338 (FIG. 2) depicted in FIG. 5 allow the gateway device 10 to communicate with various endpoint devices 11. Within this exemplary architecture, endpoint devices 11 may be characterized as, but not limited to, media storage devices and media player devices. The term "media storage devices" is used to refer to endpoint devices 11 or other gateway devices 10 that have the capability of storing media content and associated metadata that can be accessed by gateway device 10 or other endpoint devices. The media storage devices depicted in FIG. 5 include, but not limited to, a network attached storage (NAS) 503 and a personal computer (PC) 30a. The term "media player devices" is used to refer to endpoint devices 11 or other gateway devices 10 that are capable of rendering (by displaying or playing) media, including audio, video, audio/video, images, with or without the associated metadata. Media player devices may include, but are not limited to, stand alone television display devices 32, personal computers, and properly-enabled audio equipment. These media player devices include the necessary hardware to receive the media stream and render the media stream for user consumption. The media player devices may incorporate DMA functionalities or be coupled to a DMA device that provides DMA capability.

With respect to the gateway device 10 depicted in FIG. 5, it comprises a media processor 501, a media manager 507, a network module 502, a tuner module 506, a user interface module 508, and a storage device such as hard drive 154. The media processor 501 decodes/encodes and decrypts/encrypts the media content sent through the gateway device 10 and make the necessary protocol translation and/or media format conversion. For example, the media processor may convert the media stream into IP data packets. Additionally, the media processor 501 may handle DRM processing. The media manager 507 receives the IP data packets and directs the IP data packets to the appropriate endpoint device 11, other gateway device 10, or any other entity within the exemplary system that may be communicated with through network module 502. The media manager also tracks and monitors the media played on all media player devices. The media manager thus also associates the media played to users associated with these media player devices. The usage tracking data may stored in the hard drive device in the gateway device, and may be used to customize and personalize the media content and user experience provided by the gateway device (including parental control functionality, paid targeted advertisement, etc.). The media usage data may be transmitted to the service management center for analysis, and may be aggregated across all gateway devices. The network module 502 provides the interface to the IP network 99 and LAN 60. The tuner module 506 provides the capability for selectively receiving television signals, such as, but not limited to, direct broadcast satellite (DBS), cable, and/or Internet protocol television (IPTV). The tuner module 506 may select between IP "stations" by associating with the correct multicast stream, for example. The tuner 506 modulates those source signals into a form suitable for processing by the media processor 501 and transmission by the media manager 507 within the exemplary system. The user interface module 508 enables the end user to select and control functionalities of acquiring, aggregating, managing, distributing, and rendering media, including audio, video, audio/video, images, with or without the associated metadata. Specifically, the user interface module 508 enables the end user to select and control these functional by allowing the end user to input and select objects rendered by a media player device. The type of objects that may be selected or inputted via user interface module 508 may include graphical, textual and auditory information. The hard drive 154 is preferably non-volatile memory used for storing media and the associated metadata within the exemplary system. The hard drive 154 may serve as a "cache" to buffer the media before it is streamed to the media player devices to provide digital video recorder (DVR) functionalities. Further, the hard drive may be used for consistent playback if there is a mismatch in transmission speed between the endpoint device and the media source.

Figure 6:
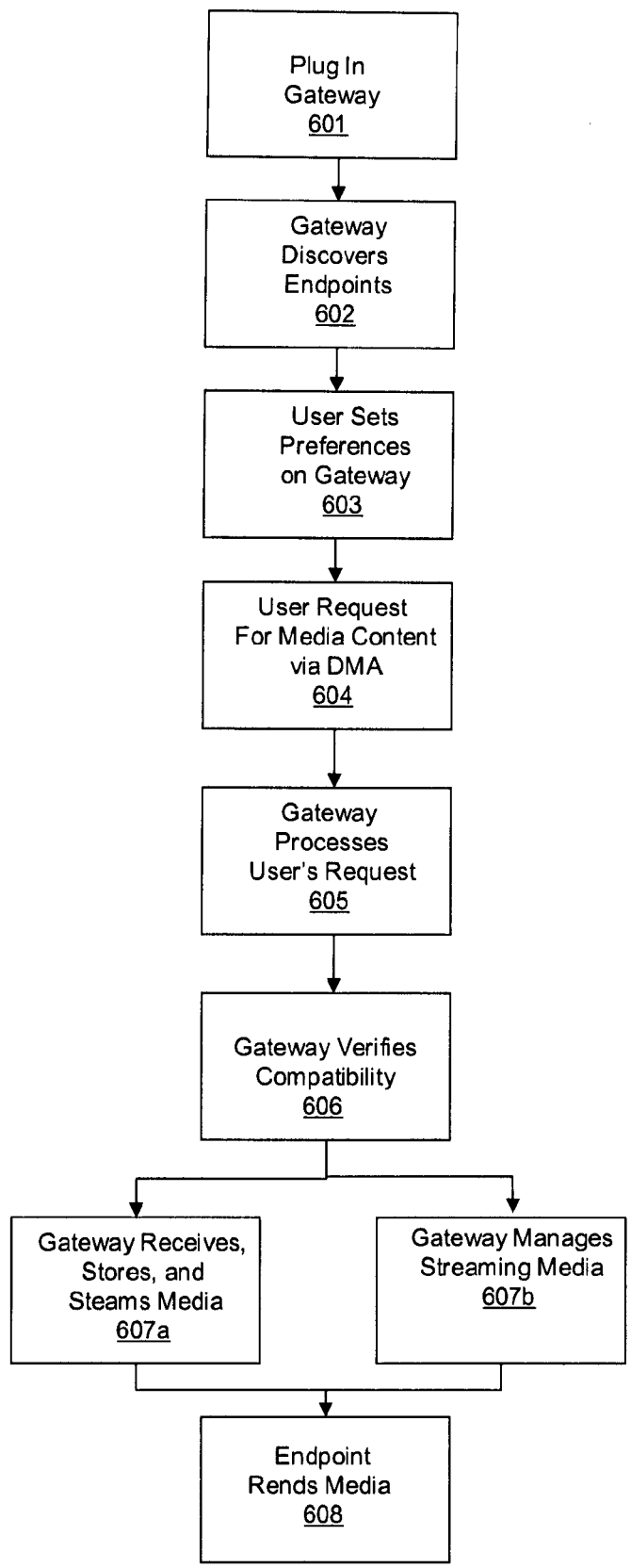
FIG. 6 is a data flow diagram that describes the process of the exemplary system that allows management of multiple media storage devices and sources in a way that provides a centralized, logical view of all media and corresponding metadata available to the user.

FIG. 6 is a data flow diagram that describes the process of the exemplary system that allows management of multiple media storage devices and sources in a way that provides a centralized, logical view of all media and corresponding metadata available to the user. At step 601, the gateway device 10 is plugged into the LAN 60 and IP network 99 on the user premises. Connecting the gateway device 10 to the LAN 60 and IP network 99 enables the gateway device 10 to be connected to various network devices including, but not limited to, endpoint devices 11 and other gateway device 10. Next (step 602), the gateway device 10 automatically discovers endpoint devices 11 on the LAN 60 and IP network 99 that are associated with gateway device 10. In this example, the gateway device acts as the router and DHCP server in the customer premises and provides the IP address. The endpoint devices, using various well-known mechanisms and protocols, then identify the gateway device and start communication with it. As mentioned previously, endpoint devices 11 may serve as media storage devices 505 and media player devices 504. Furthermore, endpoint devices 11 can store and serve media (i.e. send media across the exemplary system from one endpoint device 11 to another endpoint device 11).

The discovery of the endpoint devices 11 at step 602 may be done through open protocols, such as universal plug and play (UPnP), or through proprietary protocols supported by the gateway device 10. UPnP refers to a protocol used for streaming media or advertising/collecting media and device information over a LAN. Although the details of choosing and implementing the protocols are managed by the gateway device 10, and typically hidden from the end user so that the experience is an integrated and uniform experience across all the associated endpoint devices 11, it is possible for the user to manually add devices that do not support a discovery protocol. For example, an end user may manually input into the gateway device 10 specific information about a particular endpoint device 11, such as its IP address, MAC address, and the communications protocol (i.e. SMB, NFS, etc.) that is associated with that endpoint, so that an endpoint device 11 is associated with a particular gateway device 10.

Step 603 involves the user establishing preferences on gateway device 10 for the media content and associated metadata that meet their preference. Specifically, the end user, via an endpoint device 11 such as a properly-enabled television display device 32, accesses the gateway device 10 to enter user preferences for media content and the associated metadata they want to access and use. The user can specify whether to download and store the media content and associated metadata on the gateway device's hard drive 154 (FIG. 5). The sources for the media content and metadata may include, but is not limited to, the Internet or from multiple Internet-based subscription services, broadcast media such as cable TV and satellite TV, endpoint devices 11 associated with the gateway device 10, and other gateway devices 10 through peer-to-peer networking across IP network 99.

As part of the media content retrieval and/or collection and storage process occurring at step 603, the gateway device 10 may, in addition to or in lieu of, download media content to its hard drive 154, scan the media that resides on each endpoint device 11, other gateway devices 10, and/or from other sources that are available over IP network 99, and build a comprehensive database of metadata for all media. Using this metadata database, the gateway device 10 can search for, organize and query the metadata to enable the user to utilize the metadata to find media content. The metadata contained in the metadata database on the gateway device 10 also contains information (such as pointers) necessary to access the media, regardless of whether the media resides on an associated endpoint device 11, the gateway device 10 itself, or on another device that is accessible via the LAN 60 and/or IP network 99.

At step 604, the end user, via an endpoint device 11 with DMA functionality, such as the television display device 32, may send a request for media content by entering information or menu selection associated with the media content. The information is sent to the gateway device 10. The gateway device 10, acting as a DMS, receives the request and processes the request at step 605. When processing the request, the gateway device 10 will use the user-supplied information to search its own hard drive for the location of the media as well as all associated endpoint devices 11 and any external source that may be accessible to the gateway device 10. It should be noted, that the gateway device 10 during the searching process for the media, scans its metadata database to determine the location of the media. Then the gateway device 10 accesses the media via the location indicated in the metadata database.

Upon locating the media based on the user-supplied information, the compatibility of the found media content is compared to the rendering capabilities of the endpoint point device 11 (step 606). Because the media content may be formatted according to protocols inconsistent with the media-rendering capabilities on the associated endpoint device 11, the gateway device 10 may serve as a transcoder (i.e. decoder/encoder). The gateway device 10 may be programmed so that it possesses the ability to convert the media content in a manner suitable for display/rendering/playing on the associated digital end point device 11 that will receive the media content. For example, if an endpoint device 11, serving as a media player device 504 device, can only play MPEG2 video format, then any MPEG4 videos will have to be transcoded by the gateway device 10, so that the endpoint device 11 may render/display the video to the end user.

Alternatively, the gateway device 10, by using the user-supplied information, can determine if a rendering endpoint device 11 supports the format of the media content from the source storing the media content. If the rendering endpoint device 11 does not support the format indicated in the metadata, the gateway device 10 can then, for example, reference the metadata to locate the source of the media content, and obtain the alternative encoding. Then the media content is made available in the alternative encoding that is capable of being rendered/played on the receiving endpoint device 11.

After resolving media content compatibility issues, at step 607*a* the gateway device 10 may then receive and stream/ distribute, via the LAN 60 or IP network 99, the stored media content to any compatible endpoint devices 11 and/or other gateway device 10. The streaming of media content need not be performed concurrently with the acquisition of the content; rather the media content may be downloaded or encoded and stored on the hard drive 154 of gateway device 10 which may then be shared and streamed to the associated endpoint devices 11 and/or other gateway devices 10.

The gateway device 10 manages the streaming, including digital rights authorizations. In an example, the user may assign a media stream to a selected television display devices 32 in the house. In the particular example where the media content is a video protected by DRM, the gateway device 10 may be provisioned to, for example, 1) transcribe the DRM to make sure the media source encryption format is compatible with the endpoint DRM capabilities, and 2) signal the endpoint device that DRM is needed and redirect the endpoint device to the location on the IP network where it may acquire the proper license to unlock the DRM.

Alternatively as seen in step 607b, the gateway device 10 does not have to download the media to its hard drive 154. The gateway device 10 may also manage the streaming and rendering of media content not stored on it. With the assistance of the metadata database, the gateway device 10 may manage and control the streaming and rendering of media content stored on associated endpoint devices 11 and/or other gateway devices 10. For example, the gateway device 10 may control one endpoint device 11 or another gateway device 10 to directly stream/distribute media content to another endpoint device 11 and/or gateway device 10. Thus, the user may utilize existing media content storage on associated endpoint devices 11 and/or other gateway devices 10 to access media content and storage, and avoid the need for complete media file transfer to the gateway device 10 (and the concomitant burden on the gateway's resources).

Finally, at step 608 the media and its associated metadata arrives at the endpoint device 11. The end user, via their initial request for the media content, indicated which endpoint device 11 is supposed to receive the media content and associated metadata. At this point, the endpoint device 11 renders the media and its associated metadata and completes the process flow depicted in FIG. 6.

Thus, the process flow depicted in FIG. 6 demonstrates that gateway device 10 may be used to redirect output and to allow, from a central location, selection and control of: (i) the media content to be displayed on a particular endpoint device 11; (ii) the endpoint devices 11 registered with the gateway device 10 that store and/or render the media content; and (iii) sources outside the user premises, such as other endpoint devices 11 and/or other gateway devices 10, by utilizing the peer-to-peer capabilities of the system architecture to access media content and the associated metadata stored on those additional resources.

It should be noted that the process flow described in FIG. 6 is for exemplary purposes and is no way to be construed as a limitation. There are many other methods for handling the management of media content within the exemplary system. For example, the user when making the request for media content at step 604, may dictate where the media content and its associated metadata will be sent to by the gateway device 10 serving as the DMS. In other words, a user making a request from one endpoint device 11 serving as a DMA does not mean the gateway device 10 serving as the DMS must automatically send the response to the requesting endpoint device 11. Instead, the exemplary system allows for the gateway device 10 serving as the DMA to send media content and its associated metadata from a request for such data to any endpoint device 11, other gateway device 10, or any other device that is associated with gateway device 10 via the LAN 60 or IP network 99.

Applying the process flow of FIG. 6 and the exemplary system architecture described in FIGS. 1 and 5, examples of the management of media content are described below. For example, referring to FIG. 5, a DMA 35b attached to a television display device 32 may be configured to control a television feed from a satellite or cable provider, for example. The DMA 35b in turn is connected to the gateway device's tuner module 506 via LAN 60. The DMA 35b, as previously described, renders a "page" (i.e. menu) displayed on the television display device 32. The menu includes metadata provided by the gateway device 10, which it collects from an Internet service that is aware of the television channel line-ups in a specific region. The end user may utilize the menu to control changing channels on the tuner module 506 inside the gateway device 10. Once the user selects a "channel", or media source, the gateway device 10 proceeds to take the necessary steps to stream the video content to the DMA 35b for displaying on the television display device 32. Steps taken by the gateway device 10 may include one or all of the following: decrypt/encrypt, decode/encode, record, and/or stream.

Another example of the functionality of the exemplary system, a user of a DMA 35b in combination with a television display device 32 may browse "peer" video content on a "peer" gateway device 10. Specifically, the gateway device 10 residing on the user premises is in peer-to-peer networking relationship with another gateway device 10n residing in another user premises 70 (FIG. 1). In this scenario, the gateway device 10, using metadata, collates and prepares that video content for local consumption by, among other things, downloading and/or streaming the selected video content from the peer gateway device 10n. Specifically, the video content on gateway device 10n may be downloaded to gateway device 10 and then sent to the DMA 35b for viewing on television display device 32, or the video content on gateway device 10n could be streamed directly from gateway device 10n across IP network 99 to the DMA 35b for viewing on television display device 32.

Extending the previous example, the user may decide to redirect the selected "peer" video content to another rendering endpoint device 11 on the user premises other than the DMA 35b and television display device 32 combination. For example, referring to FIG. 5, the redirected peer video could be sent to television display device 32a, NAS 503, and/or PC 30a. If the endpoint device 11 selected for video display does not implement the same streaming protocols that the local DMA 35b is using, the task may be completed, nonetheless, because the gateway device 10 through which the video is being streamed, includes hardware/firmware/software that allows it to support various protocols and convert between media formats.

The above examples are in no way to be construed as limitations or a complete list of all the functions of the exemplary system with respect to media content management. The examples are for the benefit of one having skill in the art to be understand the application of the claimed invention. The novelty of the architecture described above allows the user to manage media content associated with gateway device 10 and endpoint device 11 through various interfaces, most preferably, an interface presented on the TV. It should also be noted that the services above can also be managed through a mobile device, such as a data enabled mobile phone, which is not directly attached to LAN 60, and is accessing the system externally through IP network 99. The mobile device, or other local or non local devices, can use the gateway device 10 as a control point to manage the streaming of content residing locally on the gateway device 10 or content on other attached devices, which are managed by the gateway device 10 through its LAN 60 or IP network 99 connections.

As previously discussed, the metadata database stores metadata associated with media content the gateway device 10 has access to from other gateway devices 10, endpoint devices 11, and other media sources. Depending on the administrative configuration of the gateway device 10, certain end users may be able to augment the metadata database, e.g., to add user voting, user "tags," etc. Because all desired metadata may not be obtained from the device on which the media content is stored, the gateway device 10 may search for and utilize services on the Internet to augment the metadata within the database. For example, metadata for album art and lyrics may not be part of the metadata imbedded with the media content. The gateway can utilize external sites to obtain the additional metadata for album art and lyrics. By updating the metadata stored within the metadata database the gateway device 10 can provide faster and more accurate access to media content.

The metadata database can also be used as a resource to determine whether a particular endpoint device 11 or another gateway device 10 has access to transfer, store, and/or render media content, for example. This capability may be exercised with respect to media residing on the gateway device 10 or on the associated endpoint devices 11. Specifically, the metadata with respect to a particular media content may be updated such that a particular endpoint device 11 and/or gateway device 10 is blocked from accessing the media content associated with the metadata. For example, some media may be tagged as being unavailable to children in the household. When a dedicated endpoint device 11 (such as a child's PC) or a common endpoint device 11 (such as the living room DMA) wishes to access media, the gateway device 10, acting as a clearinghouse, might consult the metadata to determine if the desired access is allowed.

The use of the metadata database also allows the gateway device 10 to responsively and timely manage the streaming of media content stored on endpoint devices 11. By providing essential information regarding the media content, such as identity and location, the metadata database allows the gateway device 10 to quickly locate the media content. Thus, to access and implement the advantages of the media content management of the gateway device 10, the user is not required to store the media content on the gateway device 10. The gateway device 10 is then allowed to leverage its resources by utilizing endpoint device's 11 storage that is holding the media content.

Additionally, a predictive media cache may be implemented on every DMA within the exemplary system to increase the timely interactivity, effectiveness and the responsiveness of the display to the end user of media content objects sought in and retrieved from the database. Given the size of the media databases now available to consumers, space limitations on the user interface do not allow for an extensive presentation of search options and results. Moreover, the complexity of the search process for these large databases may result in unacceptable delays in provided responses to search requests. The intent of the predictive media cache is not primarily to improve the efficiency of the database search algorithm employed to find objects in the database; rather, the predictive media cache provides an environment more responsive to the consumer search requests, reducing the user-perceived latency of the response to search requests, and giving the user more interactive control and timely direction over the search. By predicting the direction the user wishes to take a search strategy, the predictive cache delivers a more responsive and interactive search process when the user role is appropriately considered. Although described in the context of retrieval of media content from a database for media content, the invention herein described may be applied to all types of database searches and retrievals requiring interaction with a user.

Figure 7:
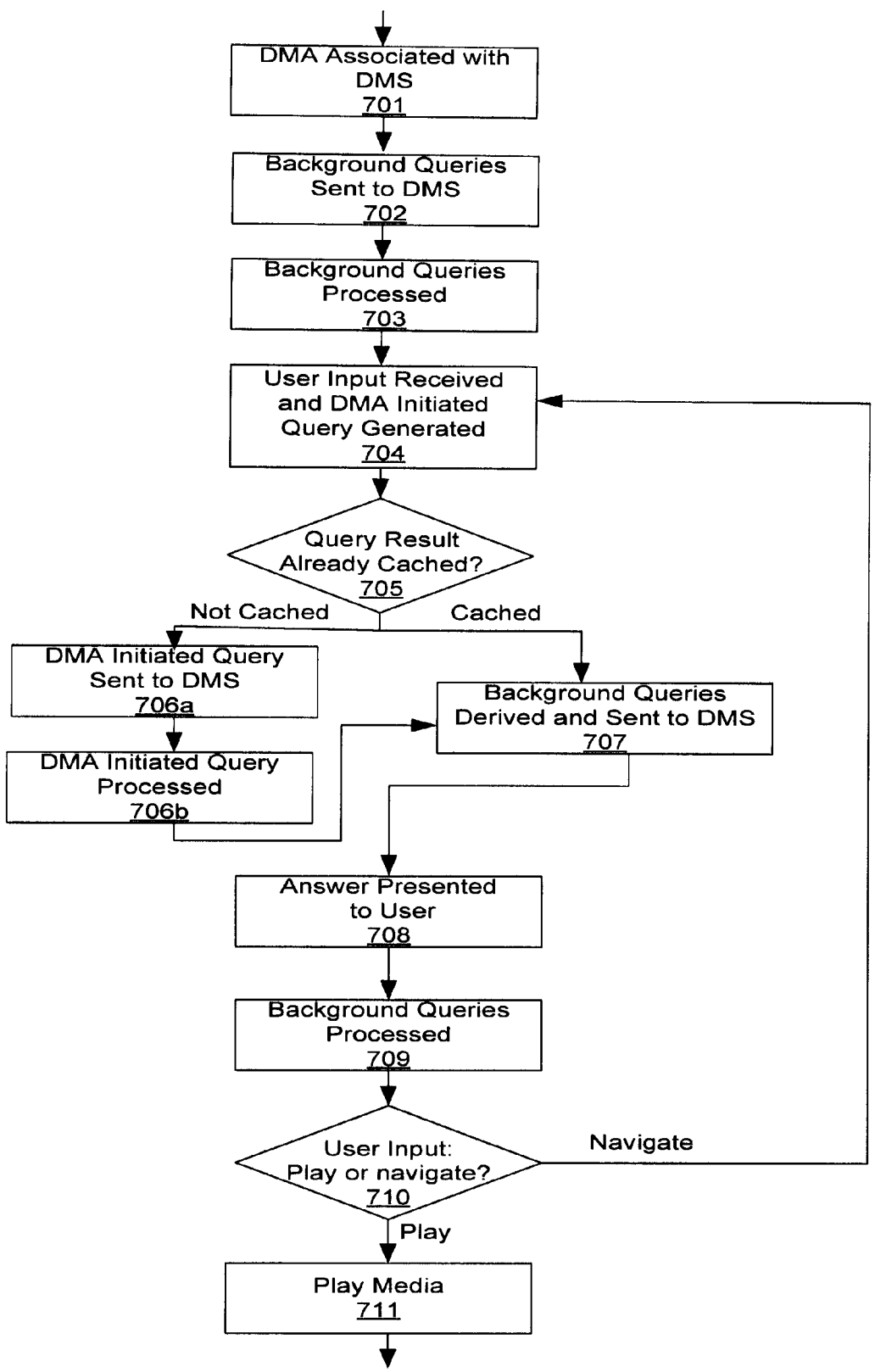
FIG. 7 is a data flow diagram for an exemplary embodiment of a predictive media cache.

FIG. 7 is a data flow diagram for an exemplary embodiment of a predictive media cache. The use of the predictive media cache enables an anticipation of the next query for media content by the end user through the use of the DMA. However, unlike caching techniques employed in other contexts where the prediction of the next query is based on the previous user input, the predictive media cache of the present invention predicts the next query based on the answers provided to the DMA and on the set of navigational choices available to the user in the user interface. Predictive caching thus takes advantage of the likelihood that the answer to result for one query determines the possible queries that immediately follow. "User input" may refer to the navigational actions taken by the user in response to media content and/or metadata associated with the icons and navigation artifacts displayed through the user interface.

Figure 8:
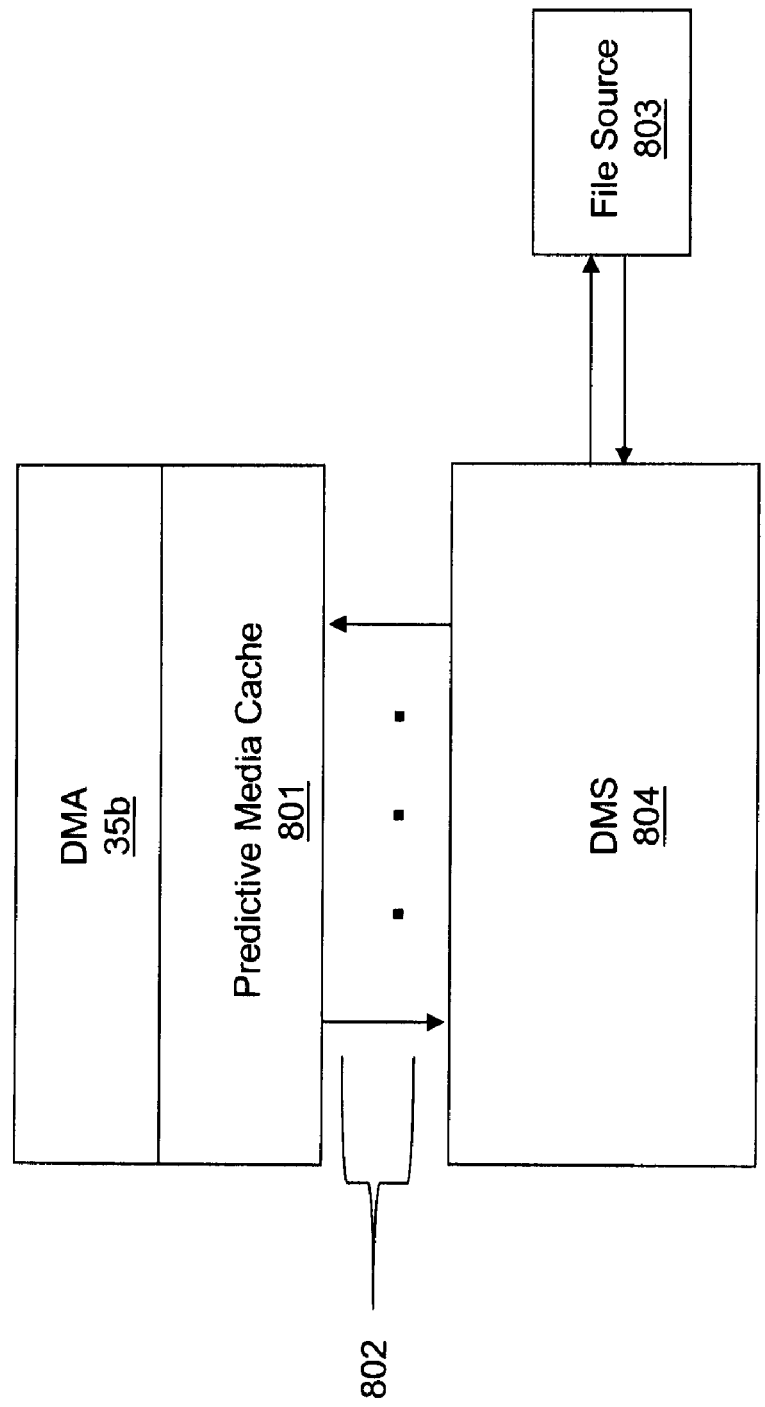
FIG. 8 displays an exemplary embodiment of a digital media adapter with a predictive media cache being associated with a digital media server.

In step 701, the DMA 35*b* is associated with a particular DMS 804 as described above with respect to FIG. 5. Referring to FIG. 8, an exemplary embodiment of a DMA 35*b* with a predictive media cache 801 (implemented as hardware, software, or a combination thereof) is shown. While the DMA 35*b* is being associated with a DMS 804 having media manager functionalities, the predictive media cache 801 may make multiple connections 802 to the DMS 804. These multiple connections enable the predictive media cache 801 to have more than one communication path available to communicate with the DMS 804. Furthermore, in step 701 the DMA 35*b* and DMS 804 negotiate the metadata schema and object count with respect to the metadata that will be sent between the DMA 35*b* and DMS 804 over the multiple connections 802. The metadata schema refers to the format for the metadata being transmitted between the DMS and DMA. The object count represents, for example, the number of types of metadata within a category (i.e. with respect to music the number of titles, artists, albums, etc.) that is associated with the media content within the exemplary system. Finally, the DMS 804 is operable to access a file source 803. The file source 803 represents any external source containing metadata associated with media that can be accessed by the DMS.

After the DMA 35*b* and DMS 804 are associated with one another, as previously stated, the DMA may allow an end user to browse available media by presenting or displaying icons and navigation artifacts as a series of "pages" or menus. The user interface comprising the menus may be displayed to the user on a television set, a monitor, a display on a portable controller, and other suitable devices. For example, FIG. 9 demonstrates an exemplary initial screen shot that may be displayed after the DMA and DMS are associated with one another.

While the end user is viewing the initial screen, at step 702, the predictive media cache queues a number of initial background queries and sends the background queries to the DMS 804. "Background query" refers to a predictive query generated by the predictive media cache 801 in anticipation of the queries generated from user input. The initial background queries correspond to, and are derived from, the media content and/or metadata associated with the icons and navigation artifacts displayed or presented to the user through the user interface, which, in the current example, is on the initial screen. Subsequent background queries correspond to, or are derived from, one or both of the user input set and the answers provided to the DMA, such as in response to DMA-initiated query. "DMA-initiated queries" are the queries that result from, or are based on, user input. The initial background queries anticipate all or at least some of the possible inputs that may be received from the user represented by a user selection of a menu item (a navigation artifact). A predictive query queue keeps track of all background queries. The background queries may be processed by the DMA during idle processing cycles.

In step 703, the background queries are processed by the DMS 804 and the predictive media cache 801 receives from the DMS the results to those queries. Typically, the results are returned before the user actually makes a query by selecting a menu option. This is in contrast to typical solutions currently employed which make the query for the data when the user selects the menu option.

In step 704, the DMA receives user input by selecting from the user input set a menu item representative of media. The DMA then generates a DMA-initiated query. In step 705, a determination is made as to whether the results to the DMA-initiated query made at step 704 are already cached. This determination may be made by comparing the DMA-initiated query to the background queries to see if there is a match. If there is a match between the background queries and the DMA-initiated query, then the answer to the DMA-initiated query already resides in the predictive media cache. The answer is then used to derive subsequent background queries (step 707), which are sent to the DMS for processing. The cached results are also provided to the DMA 35b at step 708, which is displayed to the user.

However, the answer to the DMA-initiated query may not be already cached because no background query matches the DMA-initiated query. Even if there is a match, the answer may not be already cached because the predictive media cache is still awaiting the answer to the background query from the DMS; in this case, further action awaits until the answer is received. If the answer to the DMA-initiated query is not already cached because the background queries made in anticipation of the DMA-initiated query did not match the DMA-initiated query generated from the user input, then, at step 706a, the DMA-initiated query is sent to the DMS. The DMS processes the DMA-initiated query at Step 706b. The answers received to the DMA-initiated query are then used, either alone or along with the user input set, to derive subsequent background queries at step 707. Exemplary derivations are given below in connection with the discussion of FIGS. 9-17. The answers to the DMA-initiated query are presented to the DMA for viewing by the end user.

In either case of a successful or unsuccessful prediction, while the user is viewing the answer to the DMA-initiated inquiry, the predictive media cache, at step 707, derives a new set of background queries from the answers to the DMA-initiated inquiry (whether received as a result of processing the DMA-initiated query or through the match of the DMA-initiated query to the background query). The intersection of the answers to the DMA-initiated inquiry and the user input set presented to the user through the user interface defines a set of possible user inputs that may be made next, and thus forms the basis for deriving the background queries. Again, the predictive query queue keeps track of all background queries since the last DMA-initiated query.

Specifically, in step 709, the predictive media cache 801 receives from the DMS the answers to the background queries sent to the DMS during step 707 while the end user is preparing to make the next DMA-initiated query.

In step 710, the user input determines whether to play the selected media (music, image or video) or to continue navigating the metadata or database to find desired media. If the user input determines continued navigation, the predictive media cache returns to Step 704, whereupon the user input generates a subsequent DMA-initiated query, and the steps described above are repeated. If the user input determines to play the identified media, the selected media is then presented to the user in step 711. Upon completion of the play media step, the predictive media cache method returns to step 710.

A particularly novel feature of the predictive media cache of the present invention is that, as mentioned above, it does not utilize previous user input or DMA-initiated queries to derive the background queries; rather it utilizes the answers to the DMA-initiated query (whether received through the processing of the DMA-initiated query or through a match of the DMA-initiated query to one or more background queries) to derive subsequent background queries. A further novel feature is that it may also utilize alone, or with the answers, the user input set to derive the background queries. Each of the user set and the answers define a set of possible background queries. In one implementation, the predictive media cache may be designed to derive a set of background queries based on the entire set of possible queries defined by: (1) the user input set; or (2) the answer to the DMA-initiated query; or (3) the intersection of those two sets. In an enhanced implementation, the predictive media cache may only include those background queries derived from either or both the answer and the user input set, and that have a certain minimum probability of predicting the DMA-initiated query, based on established policies or other predictive methods. These policies or methods may be predetermined or may be developed and evolve based on the particular user experience with the predictive media cache.

Figure 9:
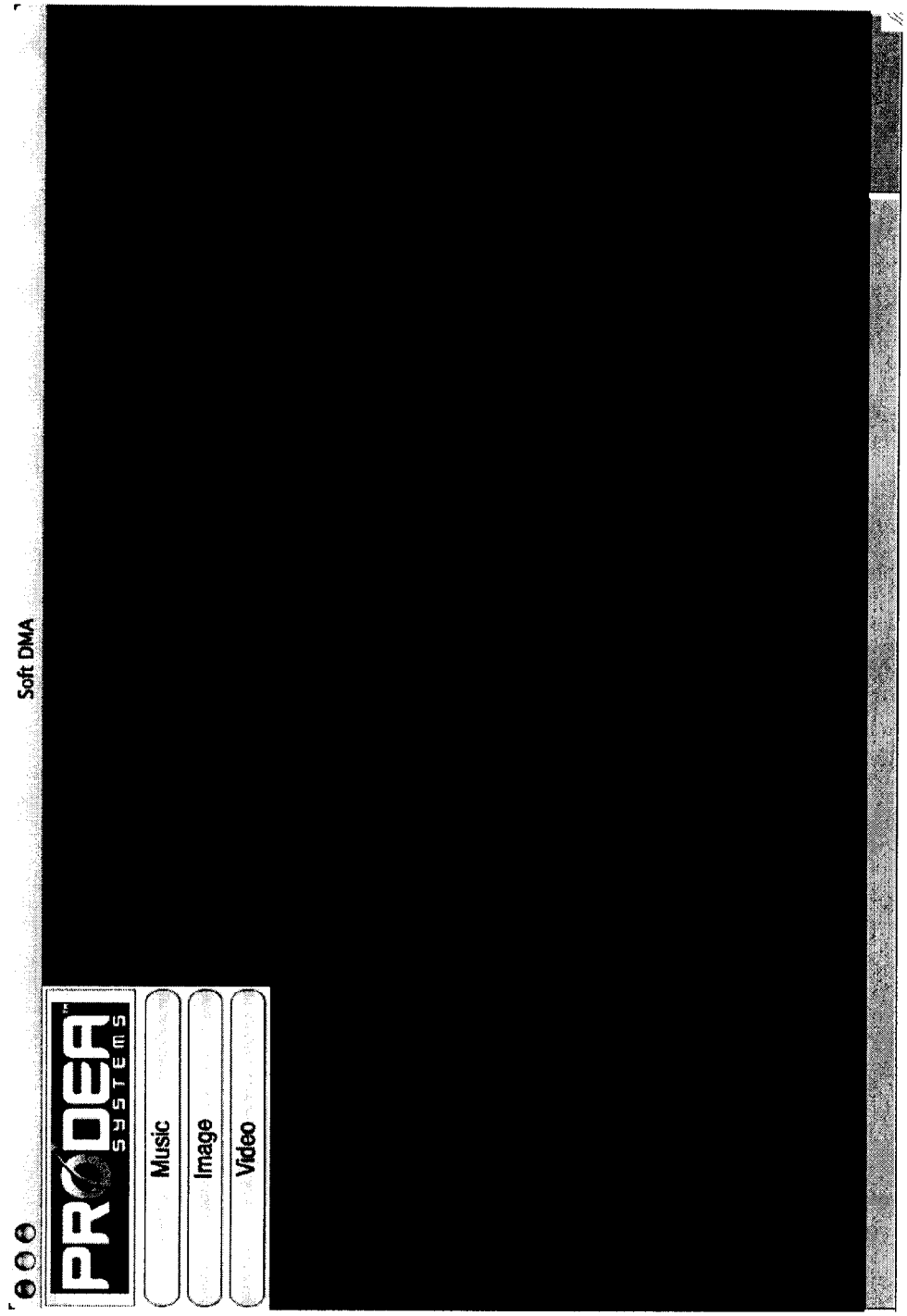
FIG. 9 demonstrates an exemplary initial screen shot that may be displayed by the digital media adapter after the digital media adapter and the digital media server are associated with one another.

Another example demonstrating the data flow of an exemplary predictive media cache process begins with the initial screen. FIG. 9 displays an exemplary initial screen that may be displayed by the DMA after being associated with a DMS (step 701). At step 702 in this example while the user is deciding what user input to provide (i.e. select music, image, or video) the predictive media cache 801 begins queuing a small number of initial background queries that are derived from the user input set, viz., the media content and/or metadata associated with the displayed navigation artifacts on the initial screen—"music," "image," and "video." Here, the possible initial background queries may include possible queries after the user selects "music," "image," or "video" from the initial screen. For example, the specific initial background query for the "music" menu item may seek to retrieve the results from a selection of "music."

Figure 10:
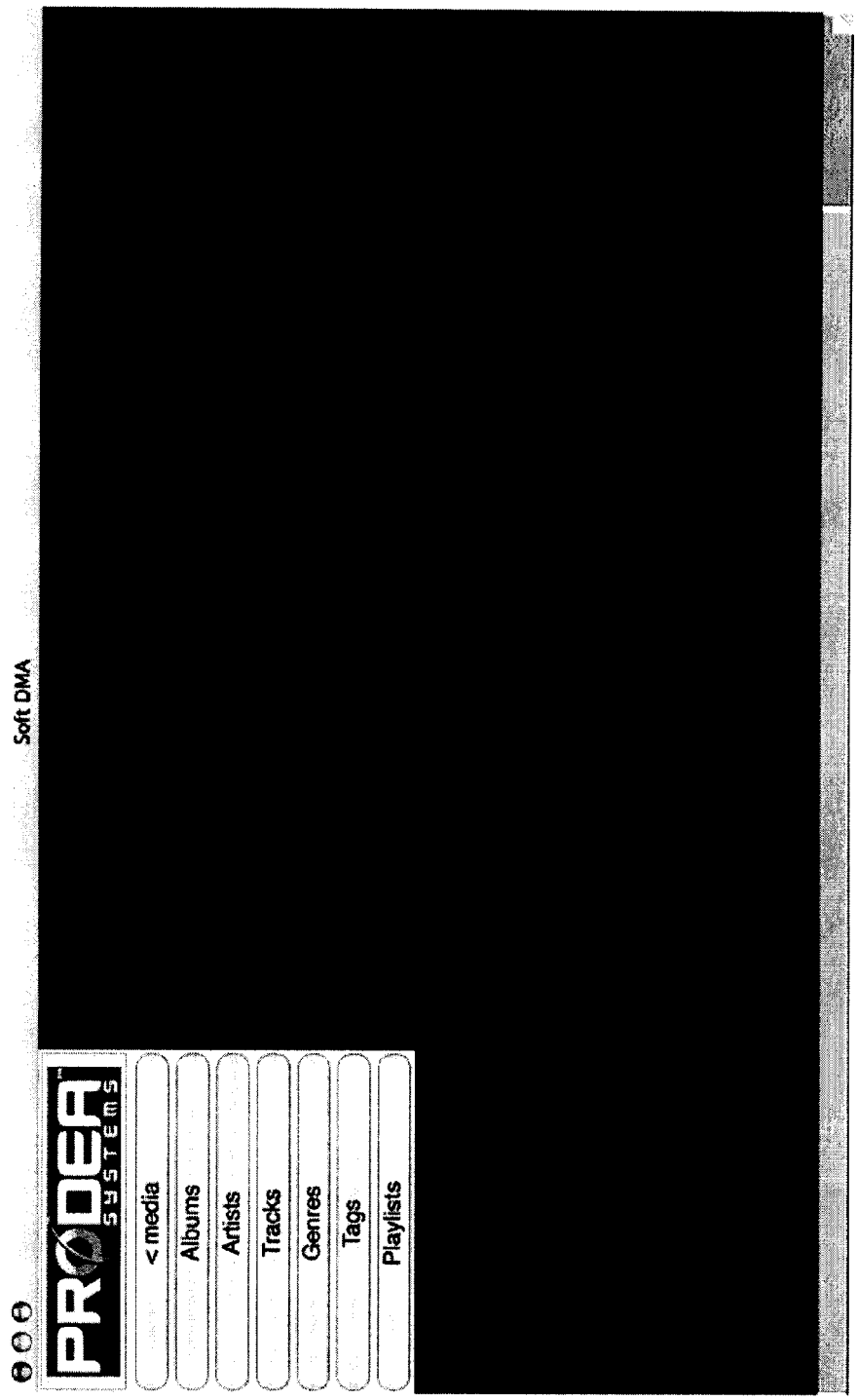
FIG. 10 is an exemplary screen shown to the user after selecting "music" from the initial screen shown in FIG. 9.

In this example, the user selects "music." The process continues to step 705 where a determination is made as to whether the answer to the DMA-initiated query made at step 704 is already cached because the DMA-initiated query matched one of the initial background queries. Here, the answer to DMA-initiated query of selecting "music" already resides within the predictive media cache because of the corresponding initial background query that was previously performed. Specifically, the answer to the DMA-initiated query is used to populate or configure the screen the DMA would display to the user after the user selects "music," which is shown in FIG. 10. FIG. 10 is an exemplary screen shown to the user after selecting "music" from the initial screen shown in FIG. 9.

While the end user is reviewing the screen shown in FIG. 10, one or more subsequent background queries are performed, where each subsequent background query reflecting a possible query that may be asked with reference to the answer received from the DMA-initiated query made at step 704. By way of example, the background queries may include, but are not limited to, each possible query represented by user input set as defined by the navigation artifacts displayed in FIG. 10. Therefore, in this example the possible DMA-initiated queries allowed on the screen shown in FIG. 10 include "<media," "albums," "artists," "tracks," "genres," "tags," and "playlists." Therefore, the first n albums titles, the first n artist names, the first n music tracks, the first n music genres, the first n tags, and the first n playlists would be queried in the background queries. The parameter n represents the number of menu items that can be displayed or each screen or page. These subsequent background queries are generated, and the results cached while the process waits for the next DMA-initiated query from the user.

Figure 11:
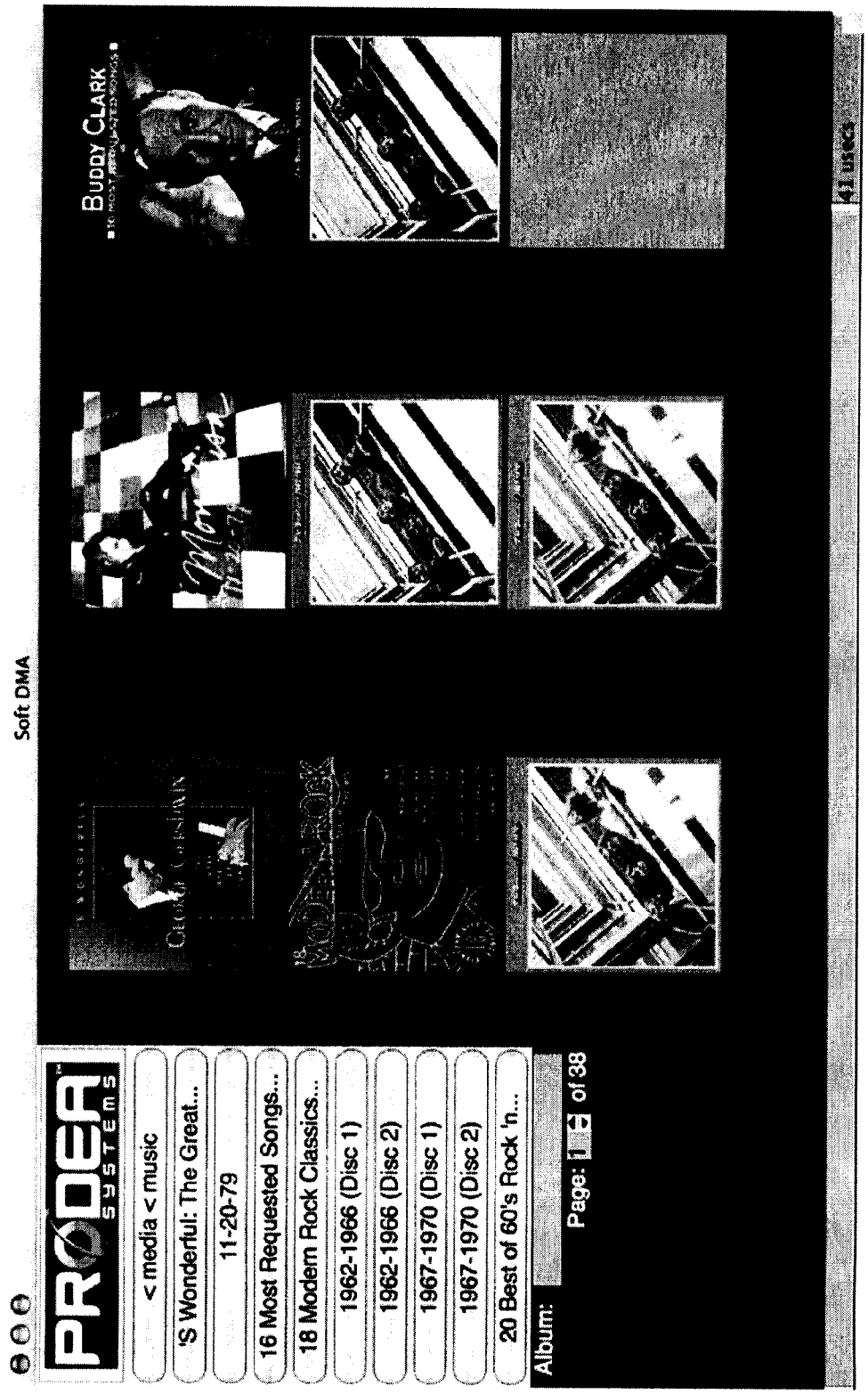
FIG. 11 is an exemplary screen shown to the user after selecting "albums" from the screen shot shown in FIG. 10.

In this example, the user selects "albums." At this point, the exemplary process refers back to step 705 where a determination is made as to whether the answer to the DMA-initiated query is already cached. Here, the answer to DMA-initiated query of selecting "albums" already resides within the predictive media cache because of the corresponding background query that was previously performed. Specifically, the answer to the DMA-initiated query for this example includes the first nine albums accessible by the DMS. FIG. 11 is an exemplary screen presented to the user after selecting "albums" from the screen shot shown in FIG. 10.

At this point, the predictive media cache derives subsequent background queries based on the answer. The answer is [concurrently] sent to the end user who may then review the screen shot shown in FIG. 11, which is the answer to the DMA-initiated query. While the end user is reviewing the screen shot shown in FIG. 11, the predictive media cache processes (step 709) one or more background queries, each reflecting a possible subsequent DMA-initiated query based on the user input in response to the answer received from the DMA-initiated query. By way of example, the background queries may include, but not limited to, (i) a query for information on the first nine tracks associated with each of the first nine albums displayed in FIG. 11, and/or (ii) a query to look for information on the next nine albums (i.e. albums 10-18). These background queries are generated, and the results cached while the process is waiting for user input and the corresponding DMA-initiated query.

In this example, the user selects "18 Modern Rock Classics" to display the musical tracks associated with this album. At this point, the exemplary process refers back to step 705 where the predictive media cache of the DMA determines whether the answer to the DMA-initiated query is already cached. Because this query was anticipated, the answer to the DMA-initiated query of selecting "18 Modern Rock Classic" already resides within the predictive media cache. Specifically, the answer to the DMA-initiated query includes the first nine musical tracks associated with this album shown in FIG. 12.

Again, at this point, the predictive media cache derives subsequent background queries based on the answer and the user input set shown on the screen in FIG. 12. The answer is [concurrently] sent to the end user who may then review the screen shot shown in FIG. 12, which is the answer to the DMA-initiated query. While the user is reviewing the screen shown in FIG. 12, the predictive media cache processes (step 709) one or more background queries, each reflecting a possible subsequent DMA-initiated query that may be based on the user input in response to the screen shown in FIG. 12. By way of example, the background queries may include, but are not limited to a query for information on the next nine musical tracks (i.e. tracks 10-18) associated with "18 Modern Rock Classic." The possible background queries are generated, and the results are cached while the process is waiting for user input.

As one having skill in the art may appreciate, the predictive media cache process outlined above can be repeated over and over again depending on user input and navigation through the screens. The above examples with respect to the predictive media cache process are for exemplary purposes only and are not to be construed as limitations. For example, the predictive media cache process is operable to return and display more or less than nine results.

It should be noted on the DMA that the predictive query queue keeps track of all queries waiting for processing. In all cases, the DMA balances responsiveness to a DMA-initiated query (i.e. user input query) while still providing sufficient processing resources to the predictive media cache so it may service the background queries. In order to increase the effectiveness and efficiency of the predictive media cache, the predictive media cache may establish multiple connections 802 to the DMS, as shown in FIG. 8. Multiple connections 802 allow for multiple background queries to be transmitted with minimal additional overhead within the exemplary system. Furthermore, a small number of background queries may be pipelined on each connection, based on the number of connections available and the size of the queue in the predictive query queue. Therefore, in the exemplary embodiment there may include multiple connections between the predictive media cache and the DMS with multiple background queries being processed across the multiple connections.

Another method used to increase the effectiveness and efficiency of the predictive media cache involves judicious implementation of the cache. For example, the predictive cache's processing needs may be met by exploiting the time slot available while a user is reviewing the answer to their DMA-initiated query. In other words, by optimizing the predictive media cache to perform within the idle time slots available while the user is reviewing the answer to their DMA-initiated query, one can increase the effectiveness and efficiency of the predict media cache within the exemplary system.

As an additional method to decrease the user's perceived latency in managing or searching their media content and associated metadata, a background query may be established each time a user enters a keystroke recognized by the DMA device while trying to run a DMA-initiated query. In other words, a separate background query would run every time a user enters a keystroke as part of a DMA-initiated query. For example, FIG. 13 displays an exemplary screen containing a search bar. The search bar allows the user to search for various media content and the associated metadata within the exemplary system. Specific to FIG. 13, the search bar enables the user to type in an artist name in order to determine whether the exemplary system has music available with respect to that artist. As an example, suppose the user types the letter "g" within the search bar. The predictive media cache would send a background query to the DMS for the first artists whose names begin with the letter "g." FIG. 14 shows an exemplary screen displaying the first n artists whose names begin with the letter "g" that are available to the user. The user may select one of the displayed artists, or enter one or more additional subsequent letters in the search bar. Each time, a background query is processed in response to the user entry. Thus, by performing a background query after every key stroke, the user's perceived latency in system response time is minimized.

Figure 13:
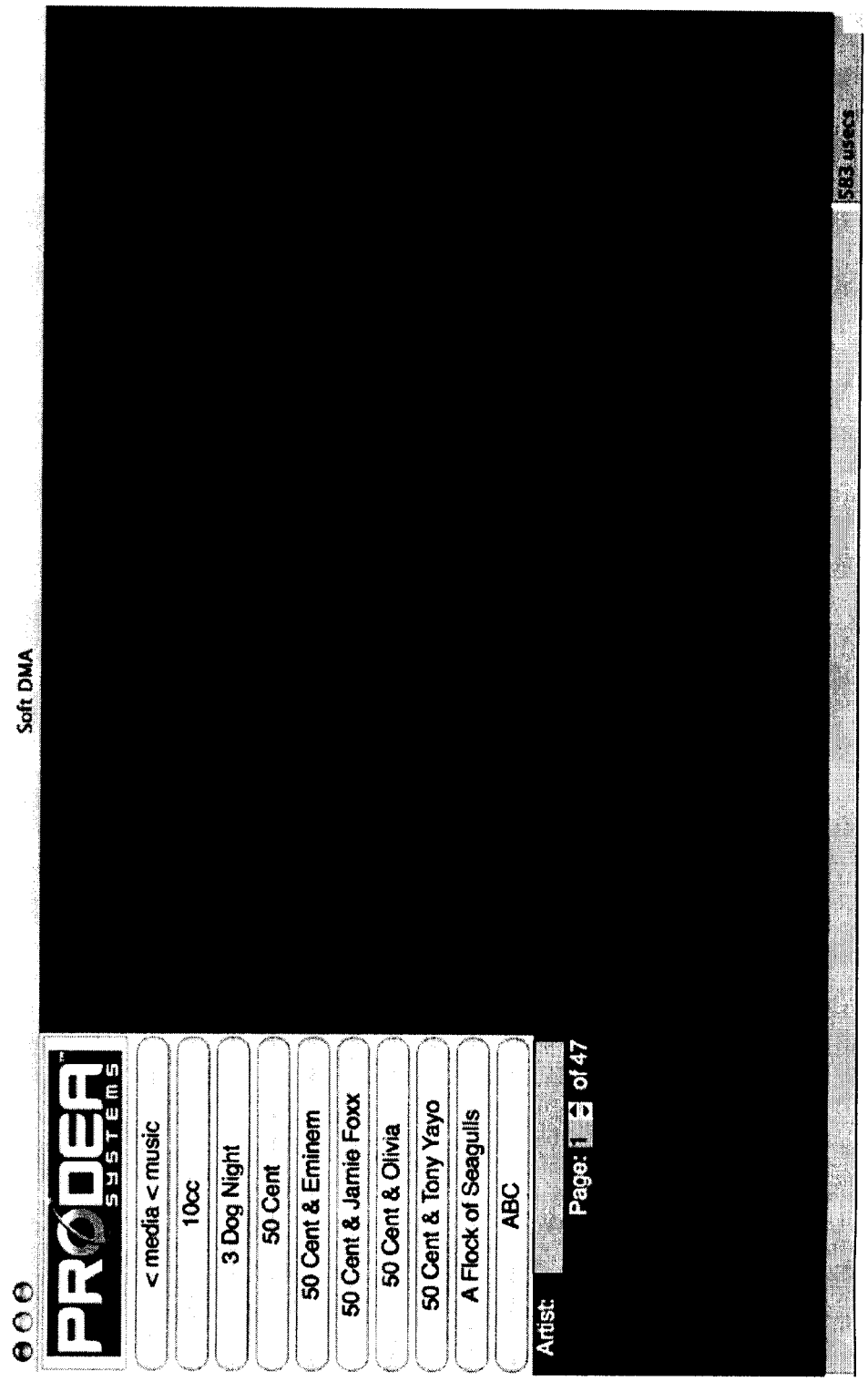
FIG. 13 displays an exemplary screen shot containing a search bar.
Figure 14:
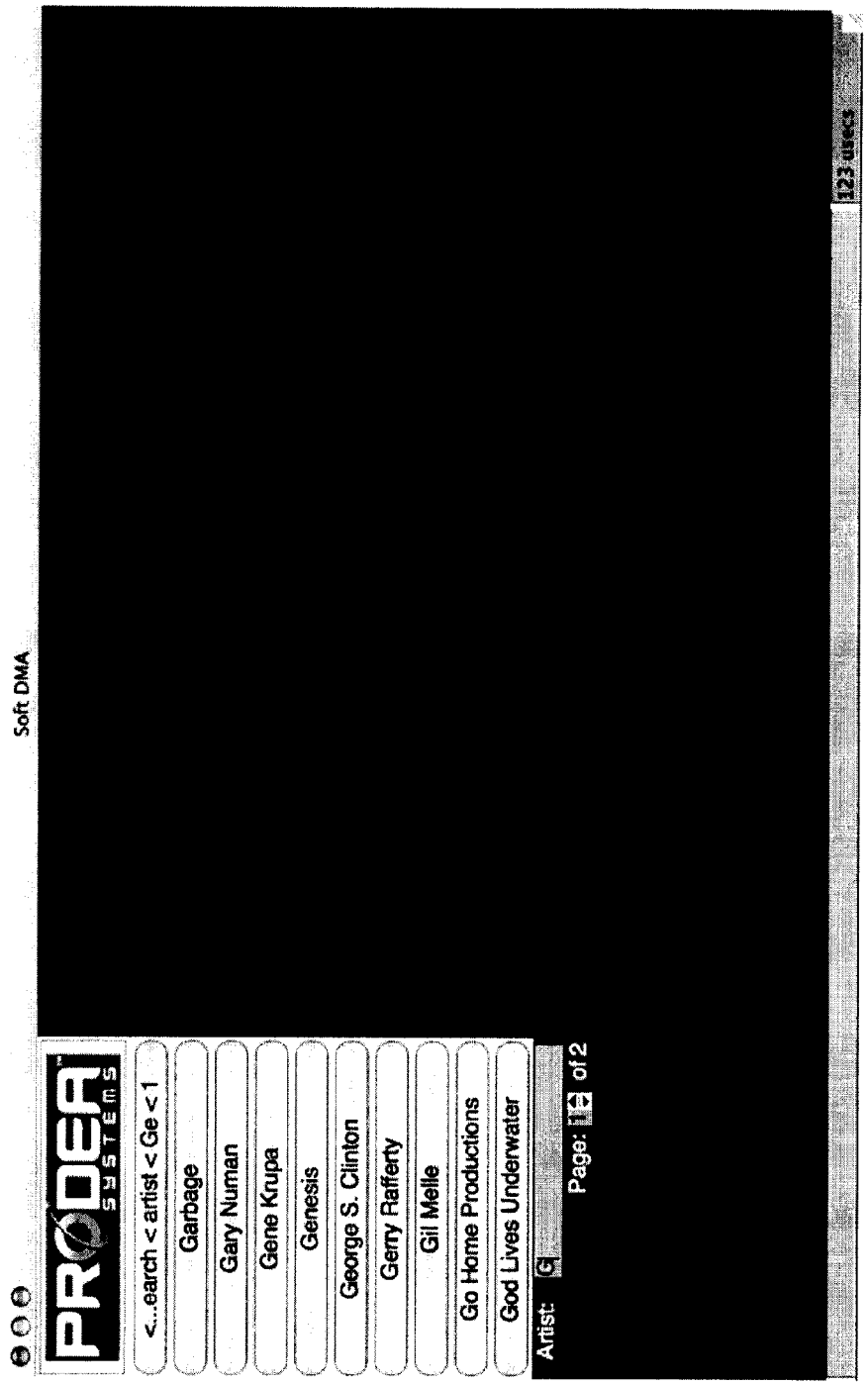
FIG. 14 displays an exemplary screen shot displaying the first nine artist that begin with the letter "g" that may be presented to the end user while the end user may be entering additional letters into the search bar of FIG. 13.
Figure 15:
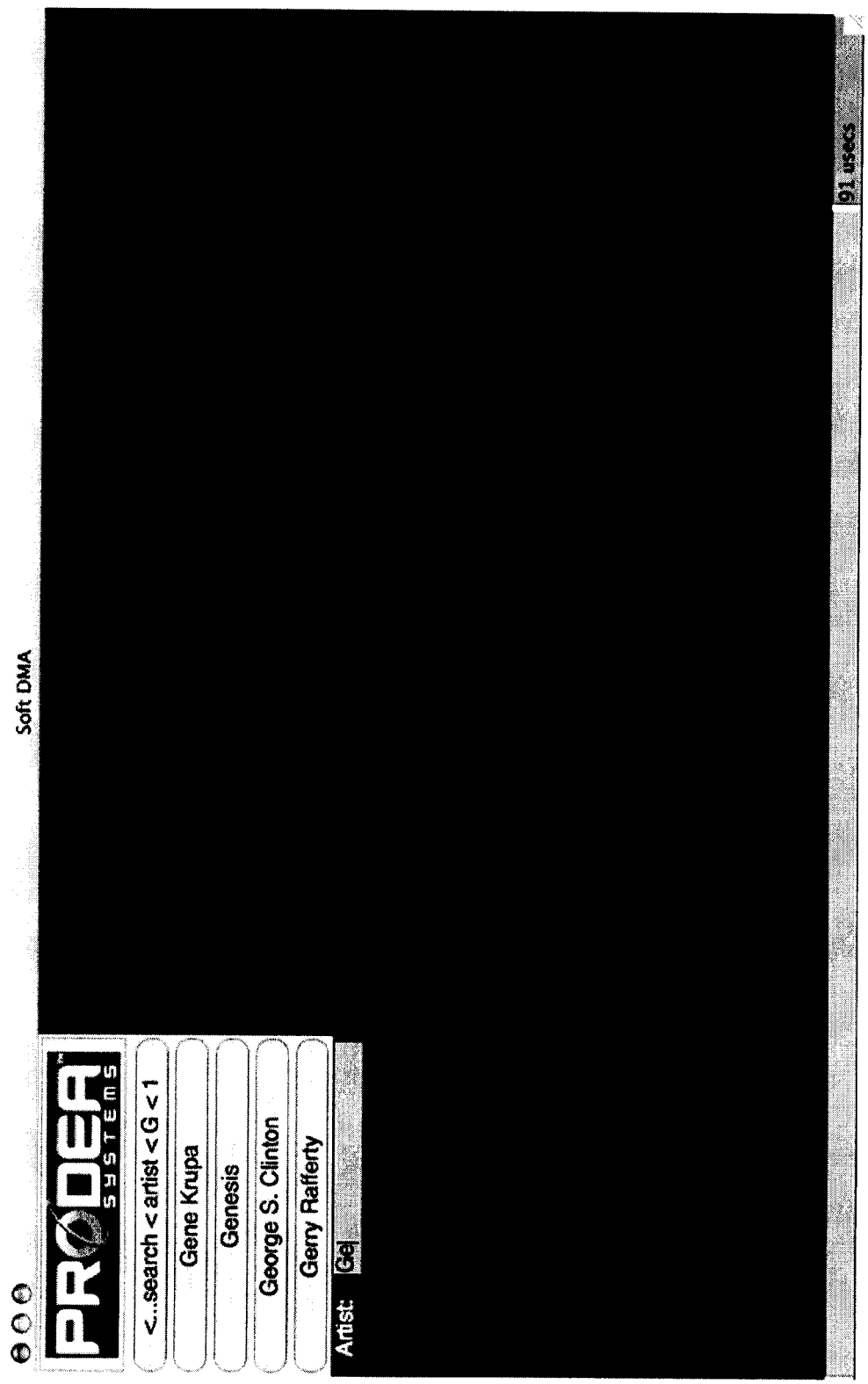
FIG. 15 displays an exemplary screen shot displaying the artist that begin with the letter "ge" that may be presented to the end user while the end user may be entering additional letters into the search bar of FIG. 13.

Alternatively, a DMA could be set up to perform a background query only after a predetermined period of time (e.g. 250 milliseconds) has elapsed where no additional keystrokes have been entered by the user (i.e. DMA-initiated query) in the exemplary search bar shown in FIG. 13. For example, assume once again the user typed the letter "g" within the search bar, but within a short period of time (i.e. less than 250 milliseconds) the user also entered a second letter "e." In this example the predictive media cache would send a query to the DMS requesting the first nine artist within the exemplary system that begin with "ge." FIG. 15 is an exemplary screen displaying the artist names that begin with the letter "ge" that are available to the user. In this example, there are only four artists within our exemplary system that have names beginning with "ge," as shown in FIG. 15. Once again, this additional approach for using the predictive media cache would increase the effectiveness and efficiency of the exemplary system with respect to managing the media content stored on the DMS and subsequently accessed by the DMA.

Yet another embodiment that may be used to enhance the end user's experience in managing their media content and associated metadata involves performing a background query for the "previous" or "next" page that may be accessed via a scroll-wheel. In other words, when the user is presented a page that displays results, but has an option to retrieve additional results by using a scroll wheel the predictive media cache would generate background queries that refer to the media content and/or metadata associated with the icons and navigation artifacts on the "next" or "previous" page that the user may view after "scrolling" to the "next" or "previous" page using the scroll-wheel.

Figure 16:
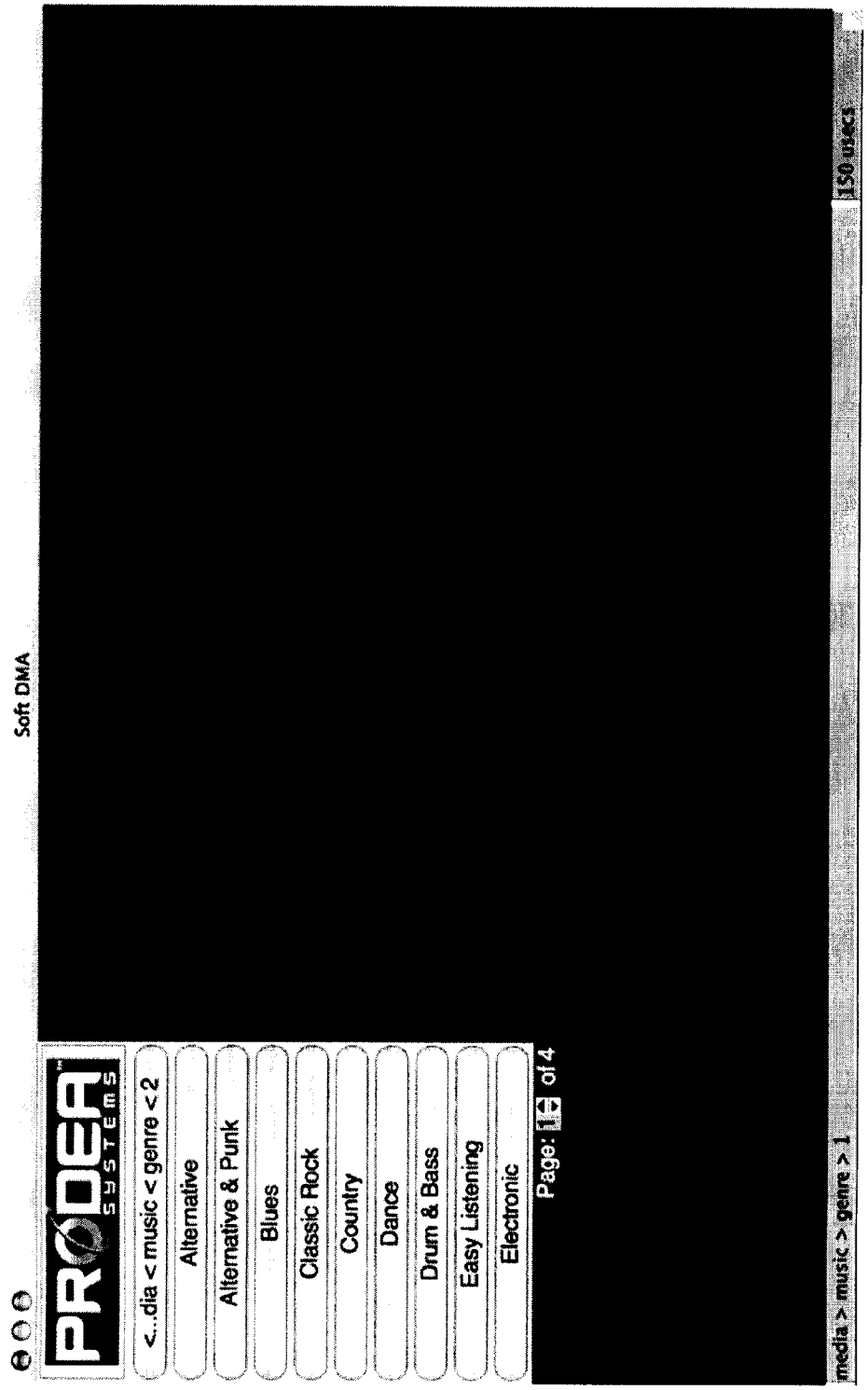
FIG. 16 displays a screen shot having an navigation artifact accessible via a scroll wheel.
Figure 17:
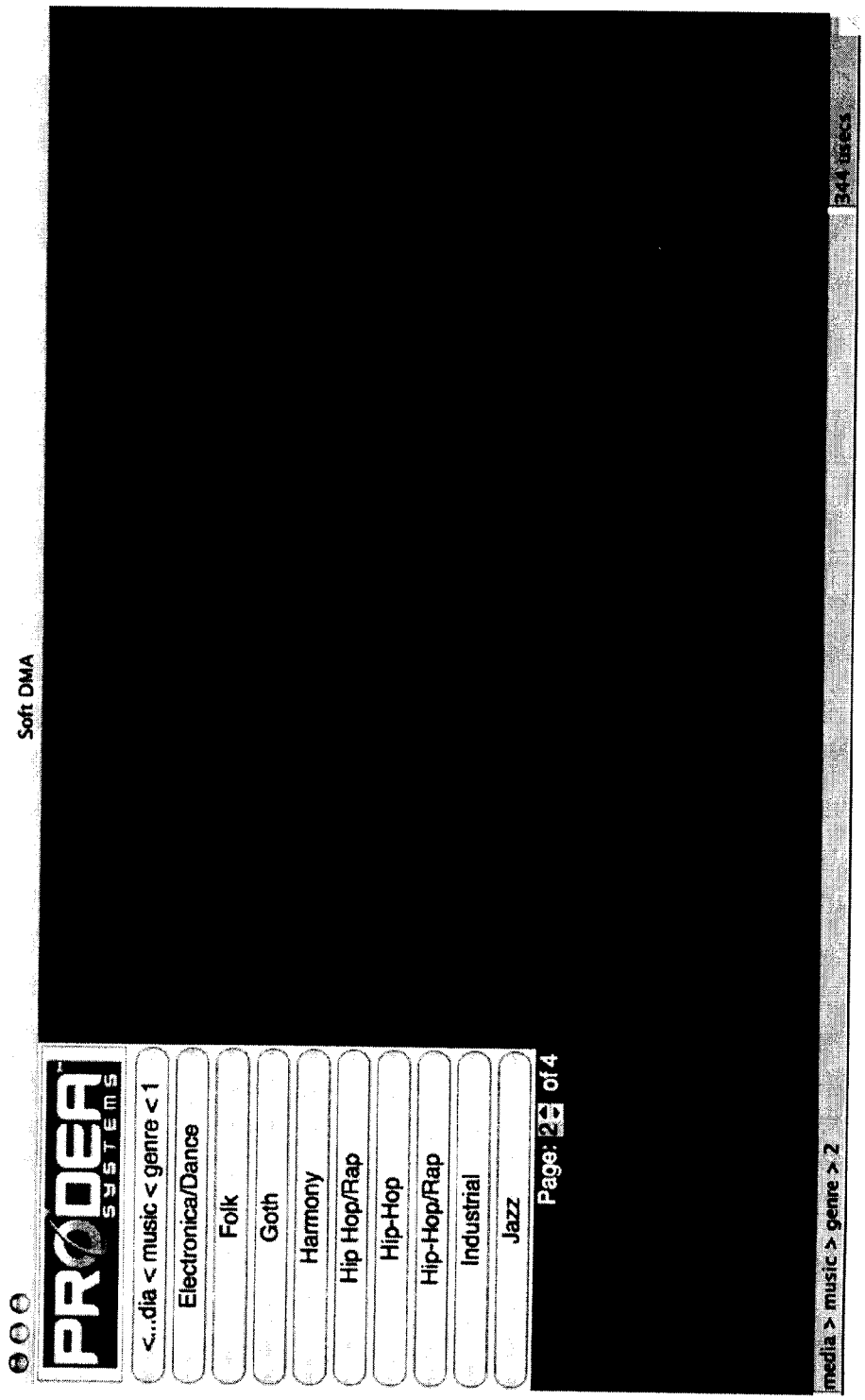
FIG. 17 displays an exemplary screen shot the user would be presented after using the navigation artifact accessible via the scroll wheel of FIG. 16.

For example, FIG. 16 is an exemplary screen having a navigation artifact accessible via a scroll wheel. Specifically, the "page: 1 of 4" within FIG. 16 is the navigation artifact that a user can control via a scroll wheel. Applying this alternative embodiment, while the user is viewing the screen shown in FIG. 16, the predictive media cache is sending a background query for the "next" page. When the end user scrolls to "page: 2 of 4" (i.e. the "next" page) the DMA would immediately present that page to the user because it would already reside within its cache. FIG. 17 is an exemplary screen of page 2 of 4. Thus, this alternative embodiment may be used to reduce the user's perceived latency in system response time.

Another method used to enhance the end user's experience in managing their media content and associated metadata involves the technique of inlining. In the exemplary system, the metadata presented to the end user via the DMA may contain "thumbnail" information. A thumbnail is generally image data. An example of a thumbnail within the exemplary system may include, but is not limited to, album covers graphics as shown in FIG. 11. In the exemplary system, when the DMS is preparing a response to either a DMA-initiated query or a background query, the DMS examines the metadata and determines if a pointer to a thumbnail graphic is contained within the answer. If the metadata contains a thumbnail pointer, the DMS retrieves the actual thumbnail image (i.e. such as from file source 803) and replaces the pointer with the actual thumbnail image. Thus, when the DMA receives the metadata, it does not have to perform an additional query to retrieve the thumbnail image data. Therefore, the user's perceived latency with respect to the system response time is minimized.

It should be noted that the predictive media cache preferably has read-only access to the metadata it stores. Accordingly, when another process on the DMS updates the metadata within the metadata database on the DMS, a notification is sent to the DMA that a portion of its predictive media cache may be invalid. In response to this notification, the predictive media cache may, as one option, flush its contents and the appropriate queries from the predictive query queue are reprocessed in order to refresh the cache. Alternatively, the predictive media cache may selectively update its contents without discarding the entirety of the contents. Synchronization of the predictive media cache contents with the data in the database may occur automatically or be in response to user prompts.

The management of the predictive media cache revolves around the goal to predict and cache answers associated with immediate future queries. In other words, data related to previous queries (i.e. DMA-initiated or background queries made prior to the current DMA-initiated query) is typically not useful for predicting future queries within the exemplary system. Accordingly, when a DMA initiated query is made, any queries and answers that are cached and are not associated with the current DMA-initiated query are deleted from the predictive media cache. Therefore, at a minimum, the only data stored within the predictive media cache are those queries and answers that refer to the media content and/or metadata associated with the icons and navigation artifacts on the "next" and "previous" possible pages that the user may select from the current page.

It should be noted that further management of the predictive media cache may be implemented to decrease the user's perceive latency when querying the DMS for media content and associated metadata by caching query and respective answers beyond the "next" or "previous" page that a user may view. However, careful implementation of such a scheme must be taken to avoid growing the size of the cache too large. When the cache is too large, the latency of the predictive media cache itself may increase.

To avoid the problems associated with growing the predictive media cache too large, but still maintain an effective predictive media cache, the data within the cache may be organized into various groups. By tagging the data within the predictive media cache as belonging to a particular group, the cache can be selectively cleared while maintaining the necessary data to effectively provide a predictive media cache. For example, in one embodiment the data within the predictive media cache may be divided into two groups: non-image and image data. The image data may include, but not limited, to metadata images as well as thumbnails. The non-image data is all other metadata being stored in the predictive media cache. Because the image data tends to consume more space within the cache, in one embodiment the image data is the first group selected for deletion from the cache before other groups. If the cache size is still too large, then a second stage is implemented to identify the non-image data for deletion and delete this data from the cache. This staged cache clearing process enables a more strategic cache management with its attendant advantages.

Other cache size management techniques include, but are not limited to, a "least recently used" method ("LRU") and a "most likely asked for" ("MLAF") method. The LRU method deletes from the cache first the data that was least recently accessed by the predictive media cache. In other words, LRU begins deletion with the least recently used data while moving forward to the most recently used data until an optimum cache size is achieved. The MLAF method identifies the data that would mostly likely be asked for and deletes first the data from the cache that is least likely asked for. The deletion of the least likely asked for data would continue until an optimum predictive media cache size is maintained.

As previously mentioned, the above methods for maintaining a desired size of the predictive media cache are presented for exemplary purposes. There is no implied limitation with respect to the predictive media cache being managed by any of the above methods. Furthermore, the predictive media cache size may be managed by other suitable methods.

The gateway device 10 and its interactions with various endpoint devices 11, service management center 201, and application service provider 98 have been described with reference to methods, apparatus (systems) and computer program products. It will be understood that elements and functions illustrated in the diagrams, can be implemented by computer program instructions running on one or more appropriately configured hardware platforms, e.g. to operate as a gateway device 10 or as one or more systems implementing functions of the service management center 201. Hence, operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

Program aspects of the technology may be thought of as "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device 10 or associated modules thereof or any of the hardware platforms as may be used in the service management center 201, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer into another computer, for example, from gateway device 10 or from another source into an element of the service management center 201. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

Those skilled in the art will recognize that the teachings of this disclosure may be modified, extended and/or applied in a variety of ways. An extension of the system architecture, for example, provides the ability of various and disparate third-party application service providers 98 to provide multiple application services independently. Application services are managed by the application service provider 98 through the service management center 201, meaning, generally, authorizing, provisioning, and monitoring the usage of a particular application service. This can be accomplished in a variety of ways with varying degrees of involvement of, or coordination with, the service management center 201. The service management center 201 could manage these items "soup-to-nuts" or have minimal involvement. For example, the service management center 201 could deal directly with the third-party application service provider 98 to acquire application services at the request of a user and manage the delivery, authorization, usage-monitoring and upgrading of the application service. At the other end of the spectrum, a service provider may have arrangements with the third-party application service provider 98 by which orders or requests from the users may come directly to the third-party application service provider 98, and services are delivered to the user by the third-party service provider who in turn coordinates with the managed service provider to register and monitor the particular application service placed in the gateway device 10. It should be noted that this ability to manage application services extends through the gateway device 10 into the endpoint devices 11 registered or associated with the gateway device 10 or service management center 201.

While embodiments of the invention have been illustrated and described in detail in the disclosure, the disclosure is to be considered as illustrative and not restrictive in character. All changes and modifications that come within the spirit of the invention are to be considered within the scope of the disclosure.

The foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system for decreasing the perceived end user latency while interacting with a database comprising:

the database storing metadata associated with one or more of media, files, data, devices and services;

an endpoint device that communicates with a digital media server via at least one of multiple connections between the end point device and the digital media server, the end point device and the digital server capable of negotiating a number of objects to be presented, the end point device located at a user premises, the endpoint device having:

a user interface operable to display a first set of query results and receive a user generated query based on the displayed first set of query results, each query result in the displayed first set of query results representing a user selectable object that navigates to another set of query results displayable by the user interface;

a processor having a predictive module operable to generate at least one background query of the database based on the displayed first set of query results and prior to a user invoking any action within the user interface, the at least one background query querying the database for another set of query results for each of the query results in the displayed first set of query results; and wherein the predictive module compares the user generated query to the at least one background query prior to sending the user generated query to the database such that if the user generated query corresponds to the at least one background query the user interface displays the another set of query results acquired from the at least one background query that correspond to the user generated query.

2. The system of claim 1 wherein the results of the at least one background query are stored in a memory.

3. The system of claim 1, wherein the predictive module sends the user query to the database for processing if not background query corresponds to the user query.

4. The system of claim 3, wherein the user interface displays an answer to the user query sent to the database by the predictive module.

5. The system of claim 4, wherein the user interface displaying the answer to the user query correlates to a second set of query results, the user interface operable to receive a second user query selected from second set of query results, each query result in the second set of query results representing a user selectable object that navigates to a different set of query results displayable by the user interface.

6. The system of claim 5, wherein the predictive module generates at least one second background query of the database based on the second set of query results and prior to the user interface receiving the second user query, the at least one second background query querying the database for the different set of query results for each of the query results in the second set of query results.

7. The system of claim 6, wherein the predictive module compares the second user query to the at least one second background query prior to sending the second user query to the database such that if the second user query corresponds to the at least one second background query the user interface displays the different set of query results acquired from the at least one second background query that correspond to the second user query.

8. The system of claim 7, wherein the predictive module sends the second user query to the database for processing if no second background query corresponds to the second user query.

9. The system of claim 8, wherein the user interface displays a second answer to the second user query sent to the database by the predictive module.

10. The system of claim 1 further comprising:
a management service center in communication with the endpoint device via multiple communications between the endpoint device and the management service center including a wide area network and operable to control the endpoint device; and
an application service provider operable to provide an application service associated with the database storing metadata,
wherein the endpoint device and the management service center negotiate a number of objects to be presented, the endpoint device further comprising:
an application service enforcement module controlled by the service management center via the wide area network, the application service enforcement module operable to enforce usage policies associated with the application service on the endpoint device at the user premises; and
an application service logic module controlled by the service management center via the wide area network, the application service logic module providing logic for the execution of the application service at the first user premises, the application service logic module in communication with the application service enforcement module and operable to provide the endpoint device access to the application service when authorized by the application service enforcement module,
wherein the application service enforcement module and the application service logic module establish an application service provider demarcation point that extends into the user premises past a wide area network demarcation point for the wide area network thereby allowing the enforcement and execution of the application service on the user premise.

11. The system of claim 1, wherein the endpoint device and the database are at the user premises.

12. A system for decreasing the perceived end user latency while interacting with a media database comprising:
the media database storing metadata associated with media;
a media manager in communication with at least one media player and operable to access the media database via at least one of a plurality of connections between the at least one media player and the media manager;
the at least one media player each having a user interface operable to display a first set of query results and receive user input based on the displayed first set of query results, wherein each query result in the displayed first set of query results representing a user selectable object that navigates to another set of query results displayable by the user interface; and
a predictive module operable to generate at least one query based on the user input and to derive at least one predictive background query of the database displayed on the displayed first set of query results and prior to a user invoking any action within the user interface, the predictive module compares the at least one generated query to the at least one derived background query such that if the generated query corresponds to the at least one background query the user interface displays the another set of query results acquired from the at least one background query that correspond to the at least one generated query.

13. The system of claim 12, wherein the user selectable object is a navigation artifact representative of metadata stored in the media database.

14. The system of claim 12, wherein the derived background queries comprise all queries that may be made by selecting the user selectable object displayed on the user interface.

15. The system of claim 12, wherein the predictive module sends the generated query to the database for processing if no generated query corresponds to any background query.

16. The system of claim 12, wherein the predictive module receives and stores an answer for each of the at least one background query.

17. The system of claim 12, wherein the metadata comprises data selected from the group consisting of actor, album, artist, artwork count, author, bit rate, composer, comment, conductor, content rating, copyright information (such as for DRM), date, date added, date modified, description, duration, director, encoded by, ensemble, kind, genre, information, graphical elements (album art, for example), keywords, language, location, location of media, license, name, organization, parental control parameters, play count, play date, play date UTC, performer, producer, rating, resolution, sample rate, size, software, source, source media, title, track count, track number, track type, total time, track ID, type, user tag data, URL, year, year of publication, year of release, and other data downloaded from the Internet.

18. The system of claim 12, wherein the predictive module performs all possible background queries of an answer to a generated query.

19. The system of claim 12, wherein the predictive module performs at least one initial query prior to the at least one background query in anticipation of the user interface displaying at least one navigational artifact on an initialization of the system.

20. The system of claim 12, wherein the plurality of connections further comprises a plurality of communication paths between the media manager and the plurality of media players.

21. The system of claim 20, wherein the plurality of communication paths are configured to handle a plurality of received generated queries and the at least one background query, the plurality of received generated queries and the at least one background query are allocated to at least one of the plurality of communication paths carrying the least amount of received generated queries and the at least one background query.

22. The system of claim 20, wherein the at least one of the plurality of communication paths is re-established when disconnected.

23. The system of claim 12, wherein the predictive module receives an update from the media database, the update identifying a changed metadata resulting in the predictive module resubmitting the at least one background query associated with the changed metadata and storing a second result of the resubmitted at least one background query.

24. The system of claim 23, wherein the predictive module receiving an update from the media database identifying the changed metadata includes deleting the result to the at least one background query least recently displayed by the user interface.

25. The system of claim 23, wherein the predictive module receiving an update from the media database identifying the changed metadata includes identifying the result to the at least one background query that would mostly likely be displayed by the user interface and deleting the result to the at least one background query that would least likely be displayed by the user interface.

26. The system of claim 12, wherein the media manager examines all answers of the at least one background query and generated query, extracts any location pointer indicative of a location in a memory storing an object, retrieves the associated object from the memory, and replaces the associated location pointer with the associated object.

27. The system of claim 26, wherein the associated object comprises the object that the associated location pointer indicated within the associated answer.

28. The system of claim 26, wherein the object comprises metadata, image data, and media content and is dynamically transmitted with a connection.

29. The system of claim 26, wherein the memory comprises at least one memory located locally and remotely from the media manager.

30. The system of claim 26, wherein the media manager selectively extracts the location pointer in response to the type and size of the object.

31. The system of claim 12, wherein the media manager and the at least one of the media players are integrated.

32. The system of claim 12, wherein the media manager and the at least one of the media player are separate devices.

33. A method for decreasing the perceived end user latency while interacting with a database, the method comprising:

aggregating metadata associated with media in the database, the database stored provided by a digital media server;

displaying on a user interface of an endpoint device, a first set of query results, wherein each query result in the displayed first set of query results representing a user selectable object that navigates to another set of query results displayable by the user interface and wherein the endpoint device communicates with the digital media server via at least one of multiple connections between the endpoint device and the digital media server, wherein endpoint device and the digital media server negotiate a number of objects to be presented;

performing at least one first predictive background query of the database based on the displayed first set of query results and prior to a user invoking any action within the user interface;

receiving and storing the another set of query results for each of the query results in the displayed first set of query results from the at least one first predictive background query;

receiving user input at the user interface;

generating at least one query based on the user input;

comparing the at least one generated query to the at least one first predictive background query; and displaying the another set of query results received from the at least one first predictive background query that correspond to the generated query in response to the at least one first predictive background query encompassing the at least one generated query.

34. The method of claim 33 wherein the first predictive background query of the database is performed before any user input is received at the user interface.

35. The method of claim 33 wherein the result to the first predictive background query is received before any user input is received at the user interface.

36. The method of claim 33 further comprising performing the at least one generated query of the database in response to the at least one first predictive background query not encompassing the at least one generated query.

37. The method of claim 33 further comprising receiving and storing the result of the at least one generated query of the database and presenting the stored result of the at least one generated background query via the user interface.

38. The methods of claim 33 further comprising deriving at least one second predictive background query of the database after comparing the at least one generated query to the at least one first predictive background query.

39. The method of claim 33 further comprising deriving at least one second predictive background query of the database from at least one of the user input and an answer to the generated query.

40. The method of claim 33, further comprising deriving subsequent predictive background queries based on the answer to the prior generated query and the user input then presented to the user.

41. The method of claim 38, wherein the at least one second predictive background query is sent to the database and the answer to the at least one second predictive background query is received before any user input is received at the user interface.

42. The method of claim 41, further comprising receiving and storing a result of the at least one second predictive background query.

43. The method of claim 42, further comprising performing the generated query when the at least one second predictive background query does not encompass the at least one generated query.

44. The method of claim 33, further comprising configuring the user interface to display at least one navigational artifact.

45. The method of claim 33, wherein performing the at least one first predictive background query further comprises performing any one or more possible queries that may be made via the user interface.

46. The method of claim 33, wherein performing the at least one first predictive background query further comprises performing the query while awaiting to receive user input.

47. The method of claim 38, wherein performing the at least one second predictive background query further comprises performing the query while awaiting to receive user input.

48. The method of claim 38, further comprising sending the at least one first predictive background query and the at least one second predictive background query across at least one communication path to the database.

49. The method of claim 48, wherein sending the at least one first predictive background query and the at least one second predictive background query across the at least one communication path further comprises re-connecting the at least one communication path when the at least one communication path is disconnected.

50. The method of claim 33, further comprising resubmitting the at least one first predictive background query in response to an update identifying the stored result of the at least one first predictive background query as being invalid.

51. The method of claim 50, wherein resubmitting the at least one first predictive background query further comprises deleting the stored result of the at least one first predictive background query, the deletion beginning with the result to the at least one first predictive background query least recently displayed by the user interface.

52. The system of claim 50, wherein resubmitting the at least one first predictive background query further comprises identifying the result to the at least one first predictive background query that would mostly likely be displayed by the user interface and deleting the result to the at least one first predictive background query that would least likely be displayed by the user interface.

53. The method of claim 33, further comprising extracting a location pointer indicative of a location of an object from the result of the at least one first predictive background query.

54. The method of claim 53, further comprising retrieving the object from a memory indicated by the location pointer within the result of the at least one first predictive background query.

55. The method of claim 54, further comprising replacing the location pointer in the result of the at least one first predictive background query with the retrieved object.

56. The method of claim 53, further comprising replacing the location pointer in the result of the at least one first predictive background query in response to the type and size of the object.

57. The method of claim 33, wherein receiving and storing the another set of query results for each of the query results in the displayed first set of query results from the at least one first predictive background query includes:
   determining whether the another set of query results includes a pointer to an image file;
   obtaining the image file;
   replacing the point with the image file; and
   storing the another set of query results with the image file therein.

58. The method of claim 57, wherein displaying the another set of query results received from the at least one first predictive background query that correspond to the generated query in response to the at least one first predictive background query encompassing the at least one generated query further includes:
   transmitting the image file within a connection; and
   displaying the image file stored with the another set of query results without having another query generated to obtain the image file.

59. A non-transitory computer-readable medium having encoded thereon a method for decreasing the perceived end user latency while interacting with a database, the method comprising:
   aggregating metadata associated with media in the database;
   displaying on a user interface of an endpoint device, a first set of query results, wherein each query result in the displayed first set of query results representing a user selectable object that navigates to another set of query results displayable by the user interface wherein the endpoint device communicates with the digital media server via at least one of multiple connections between the endpoint device and the digital media server, wherein endpoint device and the digital media server negotiate a number of objects to be presented;
   performing at least one first predictive background query of the database based on the displayed first set of query results and prior to a user invoking any action within the user interface;
   receiving and storing the another set of query results for each of the query results in the displayed first set of query results from the at least one first predictive background query;
   receiving user input at a user interface;
   generating at least one query based on the user input;
   comparing the at least one generated query to the at least one first predictive background query;
   performing at least one second predictive background query of the database in response to the at least one first predictive background query not encompassing the at least one generated query; and
   displaying the another set of query results received from the at least one first predictive background query that correspond to the generated query via the user interface in response to the at least one first predictive background query encompassing the at least one generated query.

60. The method of claim 59, further comprising receiving and storing a result of the at least one second predictive background query.

61. The method of claim 59, further comprising performing the at least one generated query when the at least one first predictive background query and the at least one second predictive background query do not encompass the at least one generated query.

62. The method of claim 59, further comprising configuring the user interface to display at least one navigational artifact.

63. The method of claim 59, wherein performing the at least one first predictive background query further comprises performing at least one possible query that may be made via the user interface.

64. The method of claim 59, wherein performing the at least one first predictive background query and the at least one second predictive background query further comprises performing these queries in parallel while awaiting to receive a user input.

65. The method of claim 59, wherein performing the at least one first predictive background query further comprises performing the query while awaiting to receive user input.

66. The method of claim 59, wherein performing the at least one second predictive background query further comprises performing the query while awaiting to receive user input.

67. The method of claim 59, further comprising sending the at least one first predictive background query and the at least one second predictive background query across at least one communication path to the database.

68. The method of claim 67, wherein sending the at least one first predictive background query and the at least one second predictive background query across the at least one communication path further comprises re-connecting the at least one communication path when the at least one communication path is disconnected.

69. The method of claim 59, further comprising resubmitting the at least one first predictive background query in response to an update identifying the stored result of the at least one first predictive background query as being invalid.

70. The method of claim 69, wherein resubmitting the at least one first predictive background query further comprises deleting the stored result of the at least one first predictive background query least recently displayed by the user interface.

71. The system of claim 69, wherein resubmitting the at least one first predictive background query further comprises identifying the result to the at least one first predictive background query that would mostly likely be displayed by the user interface and deleting the result to the at least one first predictive background query that would least likely be displayed by the user interface.

72. The method of claim 59, further comprising extracting a location pointer indicative of a location of an object from the result of the at least one first predictive background query.

73. The method of claim 72, further comprising retrieving the object from a memory indicated by the location pointer within the result of the at least one first predictive background query.

74. The method of claim 73, further comprising replacing the location pointer in the result of the at least one first predictive background query with the retrieved object.

75. The method of claim 72, further comprising replacing the location pointer in the result of the at least one first predictive background query in response to the type and size of the object.

* * * * *